(12) United States Patent
Matsufuji

(10) Patent No.: US 8,033,298 B2
(45) Date of Patent: Oct. 11, 2011

(54) HYDRAULIC VALVE EQUIPMENT OF WORKING VEHICLE

(75) Inventor: Mizuya Matsufuji, Osaka (JP)

(73) Assignee: Yanmar Co., Ltd., Osaka (JP)

( * ) Notice: Subject to any disclaimer, the term of this patent is extended or adjusted under 35 U.S.C. 154(b) by 558 days.

(21) Appl. No.: 11/686,282

(22) Filed: Mar. 14, 2007

(65) Prior Publication Data
US 2007/0151376 A1     Jul. 5, 2007

Related U.S. Application Data

(62) Division of application No. 10/593,048, filed as application No. PCT/JP2005/003629 on Mar. 3, 2005.

(30) Foreign Application Priority Data

Mar. 16, 2004  (JP) .................................. 2004-74935
Mar. 19, 2004  (JP) .................................. 2004-81252

(51) Int. Cl.
*A01G 25/09*   (2006.01)
(52) U.S. Cl. ........................................ 137/899; 137/343
(58) Field of Classification Search .................. 123/198, 123/198 R; 74/15.66, 420; 137/899, 343
See application file for complete search history.

(56) References Cited

U.S. PATENT DOCUMENTS

| | | | |
|---|---|---|---|
| 4,349,046 A * | 9/1982 | Klem ............................. | 137/899 |
| 4,388,845 A * | 6/1983 | Kishi et al. .................... | 477/100 |
| 5,385,513 A | 1/1995 | Ishii et al. | |
| 6,269,927 B1 | 8/2001 | Kanenobu et al. | |

FOREIGN PATENT DOCUMENTS

| | | |
|---|---|---|
| EP | 1 295 750 | 3/2003 |
| EP | 1 310 399 | 5/2003 |
| JP | 01-312269 | 12/1989 |
| JP | H03-121370 A | 5/1991 |
| JP | 06-147313 | 5/1994 |

(Continued)

OTHER PUBLICATIONS

English language Patent Abstracts of Japan for Japanese Patent No. 2003-094970.

(Continued)

*Primary Examiner* — John K Fristoe, Jr.
(74) *Attorney, Agent, or Firm* — Sterne, Kessler, Goldstein & Fox P.L.L.C.

(57) ABSTRACT

With regard to the present invention, valves are modularized so as to improve operativity, and the valves are formed by one member and changed the arrangement thereof so as to be miniaturized, thereby making the maintain work easy. Namely, a PTO rear cover 3c, in which a PTO driving mechanism having a PTO clutch 28 is housed, is attached to a rear end of a rear housing 3 of a vehicle body, PTO valve equipment 72 controlling on/off of the PTO clutch 28 is provided integrally with the PTO rear cover 3c, and an oil passage communicating the PTO valve equipment 72 with the PTO clutch 28 and a hydraulic port are formed in the inside of the PTO rear cover 3c. A plurality of valves is provided so as to control operation of a forward/rearward travel selector 210 and fixed to one of side surfaces of a front housing 201, an attachment member 281 formed by one plate-like member touches the vehicle body housing 201, and the valves are arranged on substantial same plane in parallel to the touching surface.

15 Claims, 19 Drawing Sheets

FOREIGN PATENT DOCUMENTS

| | | |
|---|---|---|
| JP | 08-2267 | 1/1996 |
| JP | 08-054003 | 2/1996 |
| JP | 08-156620 | 6/1996 |
| JP | 08-277802 | 10/1996 |
| JP | 11-082660 | 3/1999 |
| JP | H11-164603 A | 6/1999 |
| JP | 11-291777 | 10/1999 |
| JP | 2000-28327 | 10/2000 |
| JP | 2001-097062 A | 4/2001 |
| JP | 2003-094970 | 4/2003 |

OTHER PUBLICATIONS

English language Patent Abstracts of Japan for Japanese Patent No. 11-082660.

English language Patent Abstracts of Japan for Japanese Patent No. 11-291777.

English language Patent Abstracts of Japan for Japanese Patent No. 08-054003.

English language Patent Abstracts of Japan for Japanese Patent No. 08-156620.

English language Patent Abstracts of Japan for Japanese Patent No. 06-147312 312269.

English language Patent Abstracts of Japan for Japanese Patent No. 01-312269.

English language Patent Abstracts of Japan for Japanese Patent No. 08-2267.

English language Patent Abstracts of Japan for Japanese Patent No. 8-277802.

Supplementary European Search Report issued Jul. 1, 2008 for European Application No. 05719933.3 (PCT/JP2005003629).

* cited by examiner

HYDRAULIC VALVE EQUIPMENT OF WORKING VEHICLE

CROSS-REFERENCE TO RELATED APPLICATION

The present application is a Divisional of application Ser. No. 10/593,048, filed Sep. 15, 2006, which is incorporated in its entirety herein by reference thereto.

TECHNICAL FIELD

The present invention relates to hydraulic valve equipment of a working vehicle. More particularly, the present invention relates to a valve layout that makes the hydraulic valve equipment compact while improving operation, thereby making exchange and maintenance of the valves easy.

BACKGROUND ART

Conventionally, as described in Patent Literature 1, for example, PTO valve equipment of a working vehicle is well known. With regard to the PTO valve equipment described in Patent Literature 1, a rear end of a rear housing of a vehicle body is covered by a PTO rear cover, and the PTO rear cover supports tips of a brake support shaft of a brake braking a clutch housing of a PTO clutch, a clutch shaft, and a PTO shaft, so as to construct a sub assembly. Accordingly, the sub assembly is built in the vehicle body simultaneously when attaching the PTO rear cover to the rear end of the rear housing.

However, with regard to the PTO rear cover which is attached to power take off equipment of the working vehicle, modularization of the PTO valve equipment is not considered, and switching from a mechanical PTO clutch to a hydraulic PTO clutch is not considered. Since the conventional PTO valve equipment is positioned far from the PTO clutch mechanism, oil pressure is lost in piping and the like between the PTO valve equipment and the PTO clutch mechanism, whereby control pressure of oil is changed and the control is unstable.

On the other hand, with regard to a working vehicle such as a tractor, a forward/rearward travel selector, a high/low speed selector (transmission), and the like is disposed in a clutch housing or a transmission casing (hereinafter, referred to as a vehicle body housing). Among other things, the forward/rearward travel selector is controlled by a forward traveling hydraulic clutch and a rearward traveling hydraulic clutch so as to switch the traveling direction of the working vehicle. The equipment in which valves controlling the operation of the forward/rearward travel selector are inserted is referred to as control valve equipment, and arranging the equipment on one of the sides of the vehicle body housing is known (for example, see Patent Literatures 2 and 3).

With regard to Patent Literatures 2 and 3, construction of the control valve equipment shown in FIG. 19 is disclosed. Namely, the control valve equipment 469 is inserted into an opening 451 in one of side walls of a front housing 401 of a vehicle body housing so as to be fixed to the front housing 401. The control valve equipment 469 comprises a plate member 469a along the outer surface of the side wall of the front housing 401, an outer housing member 469b along the plate member 469a through a thin partition 450, and an inner housing member 469c along the inner surface of the outer housing member 469b, and positioned in the front housing 401.

The plate member 469a is screwed to the outer housing member 469b through the partition 450 by bolts, and the inner housing member 469c is screwed to the inner side of the plate member 469a. With regard to these members, the plate member 469a is used mainly to form an oil passage, and a connection oil passage between the plate member 469a and the outer housing member 469b is formed in the partition 450. An oil passage connecting the oil passage in the plate member 469a to the oil passage in the inner housing member 469c is arranged to face them.

A housing part 469d is formed on the outer side surface of the outer housing member 469b of the control valve equipment 469 a main relief valve 471, which controls the flow rate of pressure oil, and a directional control valve 470 are provided in the housing part 469d vertically with each other and along the longitudinal direction. A relief valve 472, a flow rate control valve 473 and an oil passage shut-off valve 474 are arranged along the longitudinal direction.

Accordingly, the conventional control valve equipment is attached separately from the forward/rearward travel selector and the like, whereby the forward/rearward travel selector can be built in the vehicle body housing easily. Furthermore, the conventional control valve equipment can be fixed to the side wall of the vehicle body housing easily, whereby the control valve equipment itself also can be attached easily.

However, since the valves are arranged laterally, the lateral width of the conventional control valve equipment is large. Furthermore, the equipment comprises plural members, making it difficult to construct the equipment compactly. A vehicle body frame is disposed longitudinally at the lateral center of a platform, and fuel tanks are arranged at left and right sides of the vehicle body frame. Then, the control valve equipment is disposed on one of the side walls of the vehicle body frame so as to be positioned in a gap between the fuel tank and the vehicle body frame. Accordingly, if the lateral width of the control valve equipment is large, the capacity of the fuel tanks arranged at left and right sides of the vehicle body frame cannot be increased.

To detach the valves from the control valve equipment so as to maintain or exchange the valves, it is necessary to remove the control valve equipment from the vehicle body frame temporarily so as to take out the valves disposed inside. This work is troublesome because the fuel tanks are arranged at left and right sides of the vehicle body frame. Even if the valves are disposed on the side surface of the control valve equipment and along the lateral direction of the vehicle body frame, it is not easy to remove the valves.

Moreover, the control valve equipment disclosed in Patent Literatures 2 and 3 is arranged by providing an opening in the side wall of the vehicle body frame. Accordingly, the production process becomes complex so as to form the opening separately, thereby improving the production cost.

---

Patent Literature 1: the Japanese Patent Laid Open Gazette 2003-94970
Patent Literature 2: the Japanese Patent Laid Open Gazette Hei.8-156620
Patent Literature 3: the Japanese Patent Laid Open Gazette Hei.8-277802

DISCLOSURE OF INVENTION

Problems to Be Solved by the Invention

In consideration of these problems, and with regard to the present invention, a PTO valve equipment such as a hydraulic valve equipment is modularized, and switching from a mechanical PTO clutch to a hydraulic PTO clutch is enabled. Loss of oil pressure is reduced so as to stabilize the control of oil pressure, and maintainability of the PTO valve equipment and the hydraulic port is improved.

Furthermore, a control valve equipment such as a hydraulic valve equipment is constructed from one member by modularizing valves, and is miniaturized by changing the arrangement of the valves, whereby a construction that is easy to maintain is obtained.

Means for Solving the Problems

With regard to the first mode of the present invention, a PTO rear cover in which a PTO driving mechanism having a hydraulic PTO clutch is housed is attached to a rear end of a rear housing of a vehicle body; a PTO valve controlling on/off of the PTO clutch is provided integrally with the PTO rear cover; and an oil passage fluidly connecting the PTO valve with the PTO clutch and a hydraulic port for oil supply and discharge of the PTO valve and the PTO clutch are formed in the inside of the PTO rear cover.

The PTO driving mechanism comprises a hydraulic PTO brake. A valve setting oil pressure is arranged to the side of the vehicle body and hydraulic oil is supplied from this valve to the PTO valve so that the PTO valve controls supply of hydraulic oil to the PTO clutch and the PTO brake.

The PTO valve may be arranged in the upper portion of the PTO rear cover. An oil inspection window may be provided in the PTO rear cover.

With regard to the first mode of the present invention, hydraulic valve equipment of a working vehicle comprises a plurality of valves so as to control operation of a forward/rearward travel selector. The valves are fixed to one of the side surfaces of a vehicle body housing, an attachment member formed by one plate-like member touches the vehicle body housing, and the valves are arranged on substantially the same plane in parallel to the touching surface.

The valves may be in parallel or perpendicular to each other. The valves may include at least an ON/OFF valve and a proportional valve controlling supply and discharge of pressure oil for the forward/rearward travel selector. The ON/OFF valve and the proportional valve may be attached and detached from the lower side of the vehicle. The valves may include at least a main relief valve and a regulating valve controlling supply and discharge of lubricating oil for the forward/rearward travel selector. The main relief valve and the regulating valve may be attached and detached along longitudinal direction of the vehicle body.

With regard to the above-mentioned hydraulic valve equipment of the working vehicle, a pressure detection means of pressure oil supplied to the forward/rearward travel selector is provided and may be attached and detached from the lower side of the vehicle.

Effect of the Invention

According to the first mode of the present invention, the hydraulic PTO clutch can be modularized. By attaching/detaching the PTO rear cover, the hydraulic clutch can be switched to be operated/not operated easily. Since the oil passage connected to the PTO valve is arranged in the PTO rear cover, oil pressure can be managed and controlled easily. The PTO clutch and the PTO valve can be arranged closely to each other so that loss of oil pressure is reduced. The reliability is also improved.

The valve setting the oil pressure is arranged to the side of the vehicle body, and hydraulic oil is supplied from the valve to the PTO valve so that the PTO valve controls supply of hydraulic oil to the PTO clutch and the PTO brake. Accordingly, the maintenance work can be performed from back. Furthermore, the control valves are concentrated, thereby improving maintainability.

The PTO valve is arranged in the upper portion of the PTO rear cover. Accordingly, space is secured in the vicinity of the PTO shaft so that the PTO valve is modulated and is close to the PTO clutch, whereby loss of oil pressure is reduced and oil pressure control is stabilized. Furthermore, the maintenance work can be performed easily from back and above.

The oil inspection window is provided in the PTO rear cover. Accordingly, the amount of pressure oil can be checked easily from back without an oil dip stick or the like. Furthermore, the number of parts can be reduced.

According to the second mode of the present invention, the lateral width of the control valve equipment can be reduced so as to construct the control valve equipment compactly, whereby the space at the left and right of the vehicle body frame can be maximized. Accordingly, the maintainability is improved, and the heat radiation ability is also improved. Furthermore, the number of parts can be reduced so as to reduce the production cost.

The valves are in parallel to or perpendicular to each other. Accordingly, the lateral width of the control valve equipment can be reduced further. Though the attachment length of each of the electromagnetic valves is large and many openings connected to the oil passages must be provided, the space for detaching and attaching the valves can be maximized by disposing the valves substantially perpendicularly to the control valve equipment.

The ON/OFF valve and the proportional valve can be attached and detached from the lower side of the vehicle. Accordingly, priority is given to the exchange of the proportional valve and the ON/OFF valve so that the valves can be maintained and exchanged easily from back. The main relief valve and the regulating valve can be attached and detached along the longitudinal direction of the vehicle body. Accordingly, a layout that minimizes the volume of the control valve equipment can be obtained.

The pressure detection means of pressure oil for the forward/rearward travel selector is provided and can be attached and detached from the lower side of the vehicle. Accordingly, the pressure detection means can be maintained and exchanged easily, and various kinds of pressures can also be measured easily.

Description of Notations

| | |
|---|---|
| 3 | a rear housing |
| 3c | a PTO rear cover |
| 10, 210 | forward/rearward travel selectors |
| 28 | a PTO clutch |
| 47 | an electromagnetic directional control valve |
| 67 | a modulate relief valve |
| 72 | PTO valve equipment (hydraulic valve equipment) |
| 77 | an inspection window |
| 90 | a PTO brake mechanism |
| 269 | control valve equipment (hydraulic valve equipment) |
| 270 | an ON/OFF valve |
| 271 | a proportional valve |
| 272 | a main relief valve |
| 273 | a regulating valve |
| 274 | a shuttle valve |

THE BEST MODE FOR CARRYING OUT THE INVENTION

Firstly, explanation will be given on entire construction of a tractor of the present invention.

Figure 1:
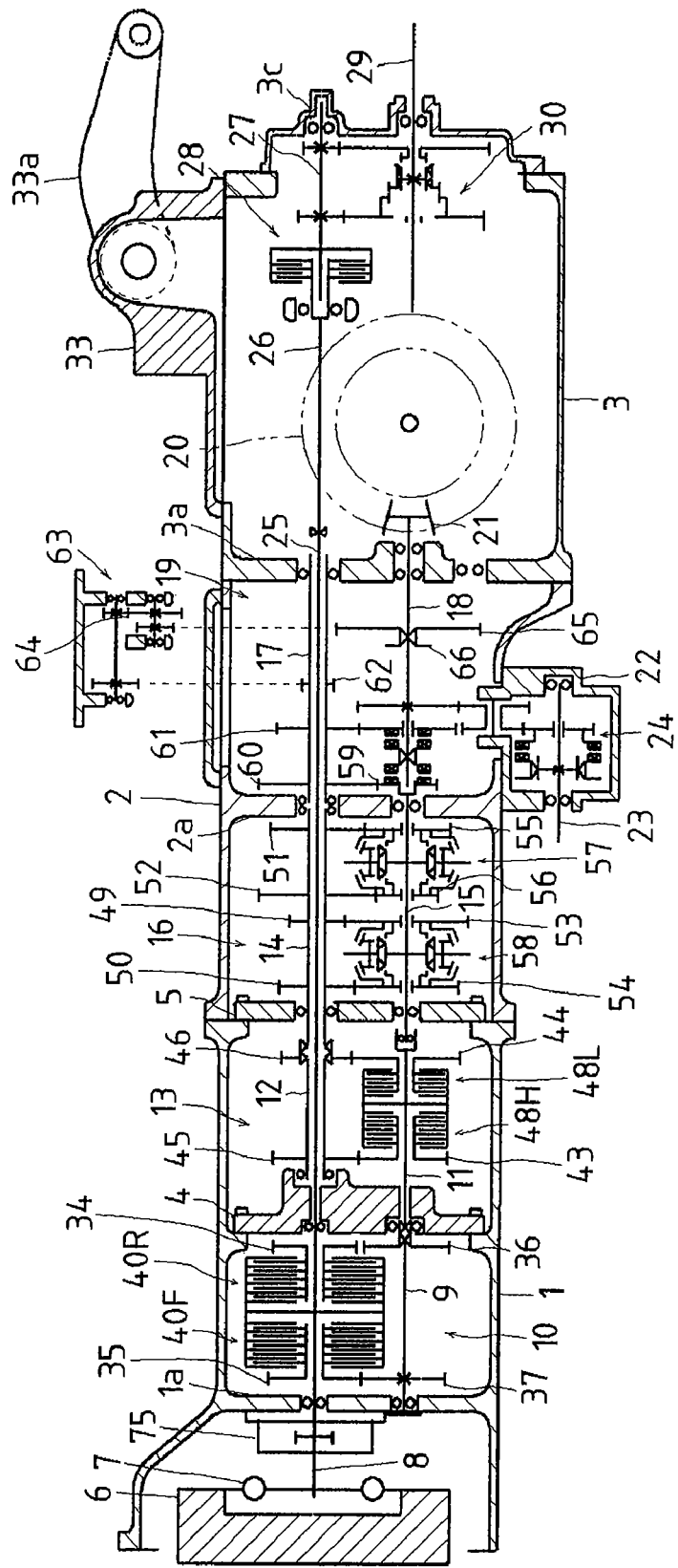
FIG. 1 It is a schematic sectional side view partially developed of entire construction of a driving mechanism of a tractor having hydraulic valve equipment concerning an embodiment of the present invention.

As shown in FIG. 1, a vehicle body housing of the tractor is constructed by providing a front housing 1, a middle housing 2 and a rear housing 3 adjacently longitudinally. A support wall 1a is provided integrally at the middle of the front housing 1. A first bearing frame 4a is attached and supported to the substantial longitudinal middle portion of the portion of inside of the front housing 1 behind the support wall 1a. A second bearing frame 4b is attached and supported to the rear end of the front housing 1. The second bearing frame 4b may alternatively be attached and supported to the front end of the middle housing 2.

A support wall 2a is provided integrally at the middle of the middle housing 2. The rear housing 3 comprises a front wall 3a, a support wall 32 at the middle, and a PTO rear cover 3c closing an opening of the rear end. An engine flywheel 6 is positioned at the front end of the inside of the front housing 1. A first driving shaft 8 is provided in the front housing 1 and connected to the engine flywheel 6 through a buffer joint 7.

A driving mechanism of a travel system is constructed by connecting a forward/rearward travel selector 10, a high/low speed selector 13, a main transmission 16 and a sub transmission 19 mutually in series. The forward/rearward travel selector 10 is disposed between the support wall 1a and the first bearing frame 4a, and between the first driving shaft 8 and a driven shaft 9 arranged therebelow. The high/low speed selector 13 is disposed between the first bearing frame 4a and the second bearing frame 4b, on the extension of the driven shaft 9, and between a driving shaft 11 connected to the driven shaft 9 and a hollow driven shaft 12 arranged on the extension of the first driving shaft 8. The main transmission 16 is disposed on the extension of the driven shaft 12, between a hollow driving shaft 14 connected to the driven shaft 12 and a driven shaft 15 disposed on the extension of the driving shaft 11. The sub transmission 19 is arranged in the rear portion of the middle housing 2, and between the driven shaft 15 and a propeller shaft 18 arranged on the extension thereof so as to include a hollow counter shaft 17 arranged on the extension of the driving shaft 14.

The rear end of the propeller shaft 18 is extended into the rear housing 3 and has a small bevel gear 21 engaging with an input bevel gear 20 of a differential (not shown) for left and right rear wheels. A front wheel driving force extraction casing 22 is attached to the bottom of the middle housing 2. The propeller shaft 18 is connected through a front wheel driving clutch 24 to a front wheel driving force extraction shaft 23 supported by the front wheel driving force extraction casing 22.

With regard to the driving mechanism of PTO system, a transmission shaft 25 penetrates the hollow driven shaft 12, driving shaft 14 and counter shaft 17, and the front end of the transmission shaft 25 is connected to the first driving shaft 8. A transmission shaft 26 is provided in the rear housing 3 and connected to the rear end of the transmission shaft 25, and a clutch shaft 27 is arranged on the extension of the transmission shaft 26. A PTO clutch 28 is disposed between the shafts 26 and 27. A PTO shaft 29 is arranged below the clutch shaft 27 and extended rearward from the PTO rear cover 3c. A PTO transmission 30 having two speed change stages is arranged between the clutch shaft 27 and the PTO shaft 29. A hydraulic lift 33 is arranged on the upper surface of the rear housing 3 and comprises left and right lift arms 33a so as to move vertically a working machine (not shown) driven by the PTO shaft 29.

With regard to the forward/rearward travel selector 10, two gears 34 and 35 are freely fitted on the first driving shaft 8, and two gears 36 and 37 are fixed on the driven shaft 9. The gears 34 and 37 engage directly with each other, and the gears 35 and 36 engage with each other through a middle idler gear (not shown). A forward travel hydraulic clutch 40F and a rearward travel hydraulic clutch 40R are disposed on the first driving shaft 8, between the gears 34 and 35.

Each of the forward travel hydraulic clutch 40F and the rearward travel hydraulic clutch 40R is well-known multiple disc type so that plural frictional elements are supported by the gear and a clutch cylinder arranged in turn so as to be slidable and not rotatable relatively, whereby a biased piston is moved toward the frictional elements hydraulically so as to engage the clutch. By engaging the forward travel hydraulic clutch 40F so as to combine the gear 34 with the first driving shaft 8, the driven shaft 9 is rotated to the forward travel direction. By engaging the rearward travel hydraulic clutch 40R so as to combine the gear 35 with the first driving shaft 8, the driven shaft 9 is rotated to the rearward travel direction.

With regard to the high/low speed selector 13, two gears 43 and 44 are freely fitted on the driving shaft 11 connected to the driven shaft 9 by the boss part of the gear 36, and two gears 45 and 46 are fixed on the driven shaft 12. The gears 43 and 45 engage with each other, and the gears 44 and 46 engage with each other. A high speed hydraulic clutch 48H and a low speed hydraulic clutch 48L sharing the same clutch cylinder fixed on the driving shaft 11 are disposed on the driving shaft 11, between the gears 43 and 44.

The high speed hydraulic clutch 48H is well-known multiple disc type so that plural frictional elements are supported by the boss part of the gear 43 and the clutch cylinder arranged in turn so as to be slidable and not rotatable relatively, whereby a biased piston is moved toward the frictional elements hydraulically so as to engage the clutch. The low speed hydraulic clutch 48L is a so-called spring hydraulic type multiple disc clutch so that plural frictional elements are supported by the boss part of the gear 44 and the clutch cylinder arranged in turn so as to be slidable and not rotatable relatively, whereby a piston biased by a disc spring is moved toward the frictional elements hydraulically so as to engage the clutch. As the structure of the spring hydraulic type multiple disc clutch, the known arts may be used, and detailed explanation of the structure is omitted.

With regard to the main transmission 16, four gears 49, 50, 51 and 52 are fixed on the driving shaft 14, and four gears 53, 54, 55 and 56 are freely fitted on the driven shaft 15. Corresponding two of these gears engage with each other. Two plural synchronous clutches 57 and 58 are disposed on the driven shaft 15, between the gears 53 and 54 and the gears 55 and 56 so as to make one of the gears 53, 54, 55 and 56 engage with the driven shaft 15 selectively, whereby four speed change stages are obtained.

With regard to the sub transmission 19, the counter shaft 17 is connected through a train of reduction gears 59 and 60 to the driven shaft 15 reductively, and two gears 61 and 62 are foxed on the counter shaft 17. A gear 64 connected through a reduction gear mechanism 63 is disposed on the counter shaft 17, outside from the small diameter gear 62. A shift gear 65 is freely fitted on the propeller shaft 18 so as to engage selectively with the gear 64 or 62. A dual clutch 66 is disposed which is operated to the position combining the shift gear 65 with the propeller shaft 18 or the position connecting the propeller shaft 18 directly to the driven shaft 15. Accordingly, the sub transmission 19 selectively causes four stages of speed change, the first stage by the engagement of the gears 64 and 65, the second stage by the engagement of the gears 62 and 65, the third stage by the engagement of the gear 65 with the propeller shaft 18, and the fourth stage by the direct connect of the propeller shaft 18 directly the driven shaft 15, on the propeller shaft 18.

Next, explanation will be given on the rear portion of the tractor.

Figure 2:
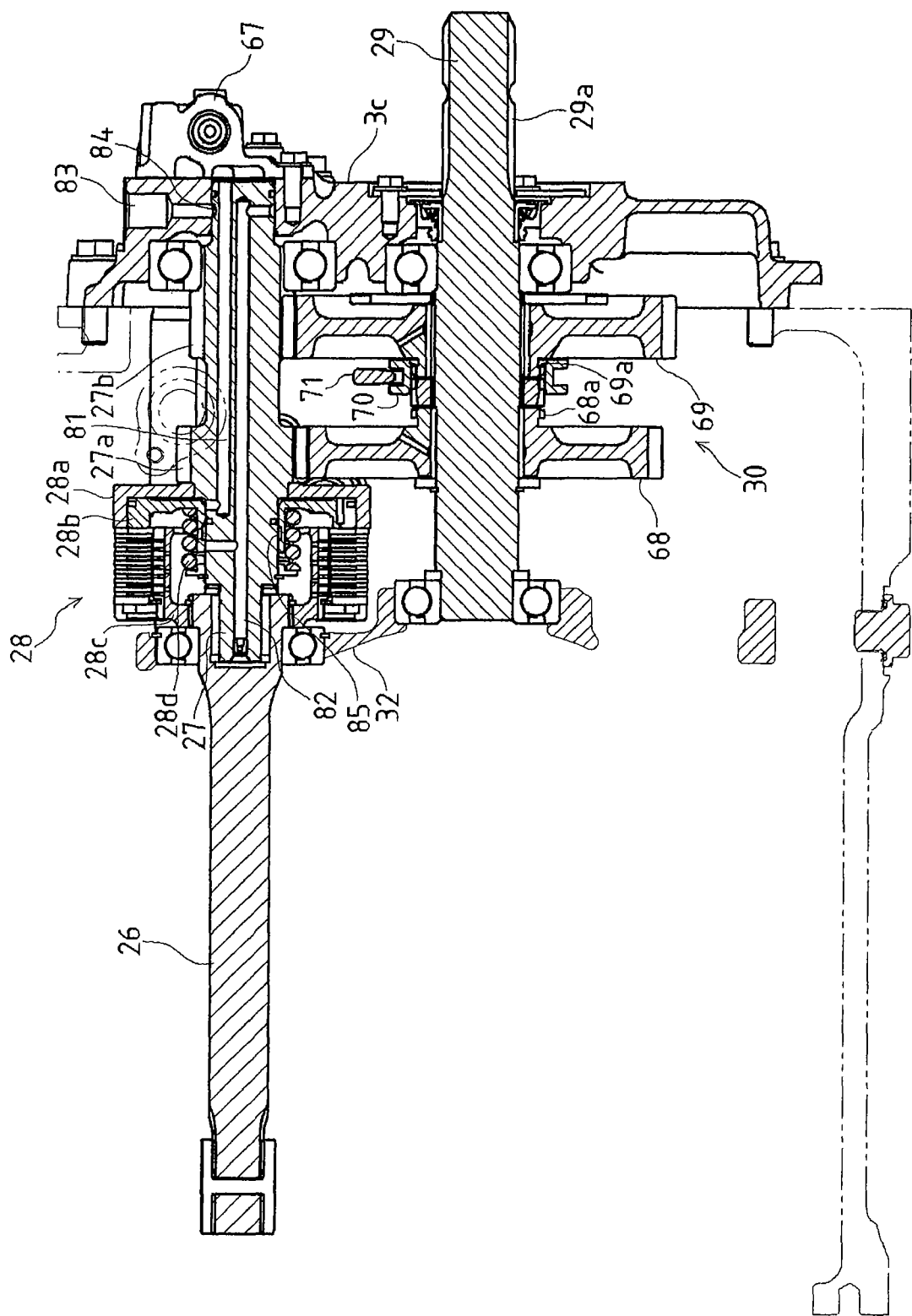
FIG. 2 It is a sectional side view of the rear portion of the tractor.

As shown in FIG. 2, the rear end of the transmission shaft 26 is rotatably supported by the support wall 32 provided at the middle of the inside of the rear housing 3. Both ends of the clutch shaft 27 are rotatably supported respectively by a bearing hole at the rear end of the transmission shaft 26 and the PTO rear cover 3c. A spline 29a is formed at the rear end of the PTO shaft 29 so as to be connected to a universal joint (not shown) attached to a working machine.

With regard to the PTO clutch 28, a rotary boss 28c is fixed to the rear end of the transmission shaft 26, and a clutch housing 28a is fixed to the front end of the clutch shaft 27. The rotary boss 28c and the clutch housing 28a support plural frictional elements so as to be slidable and not rotatable relatively. In the clutch housing 28a, a piston 28b is biased rearward by a spring 28d. The PTO clutch 28 is a so-called multiple disc type hydraulic clutch so that the frictional elements are pressed to touch each other by moving the piston 28b forwardly hydraulically, whereby the clutch is engaged.

A pressure oil passage 81 opened behind the piston 28b is formed in the clutch shaft 27 in parallel to the axis and is opened on the rear surface of the clutch shaft 27. A lubricating oil passage 82 is provided in the clutch shaft 27 so as to supply lubricating oil to the frictional elements of the PTO clutch 28.

With regard to the lubricating oil passage 82, the opening into the clutch housing 28a is closed by the piston 28b when the clutch is disengaged, and is opened through an oil hole 85 formed in the piston 28b when the piston 28b is moved forward so as to engage the clutch.

The lubricating oil passage 82 also supplies lubricating oil to the support part at the front end of the clutch shaft 27. The basal end of the lubricating oil passage 82 is opened to a circular oil chamber 84 formed between the clutch shaft 27 and the PTO rear cover 3c. A lubricating oil port 83 provided in the PTO rear cover 3c is connected to the oil chamber 84.

As shown in FIG. 2, with regard to the PTO transmission 30, two gears 27a and 27b are formed on the clutch shaft 27 so as to be rotated integrally with the clutch shaft 27, and gears 68 and 69 are freely fitted on the PTO shaft 29. The gear 27a engages with the gear 68, and the gear 27b engages with the gear 69. A shifter sleeve 70 is provided on the PTO shaft 29 so as not to be rotatable relatively and to be slidable axially. The shifter sleeve 70 is engaged with a shifter fork 71. Spline teeth are provided on the inner peripheral surface of the shifter sleeve 70 so as to engage with teeth 68a and 69a formed on the boss parts of the gears 68 and 69. Accordingly, the shifter sleeve 70 is selectively displaced slidingly by the shifter fork 71 so as to cause two stages of speed change, the first stage by engaging the shifter sleeve 70 with the teeth 68a so as to combine the gear 68 with the PTO shaft 29, and the second stage by engaging the shifter sleeve 70 with the teeth 69a so as to combine the gear 69 with the PTO shaft 29, selectively on the PTO shaft 29.

Figure 3:
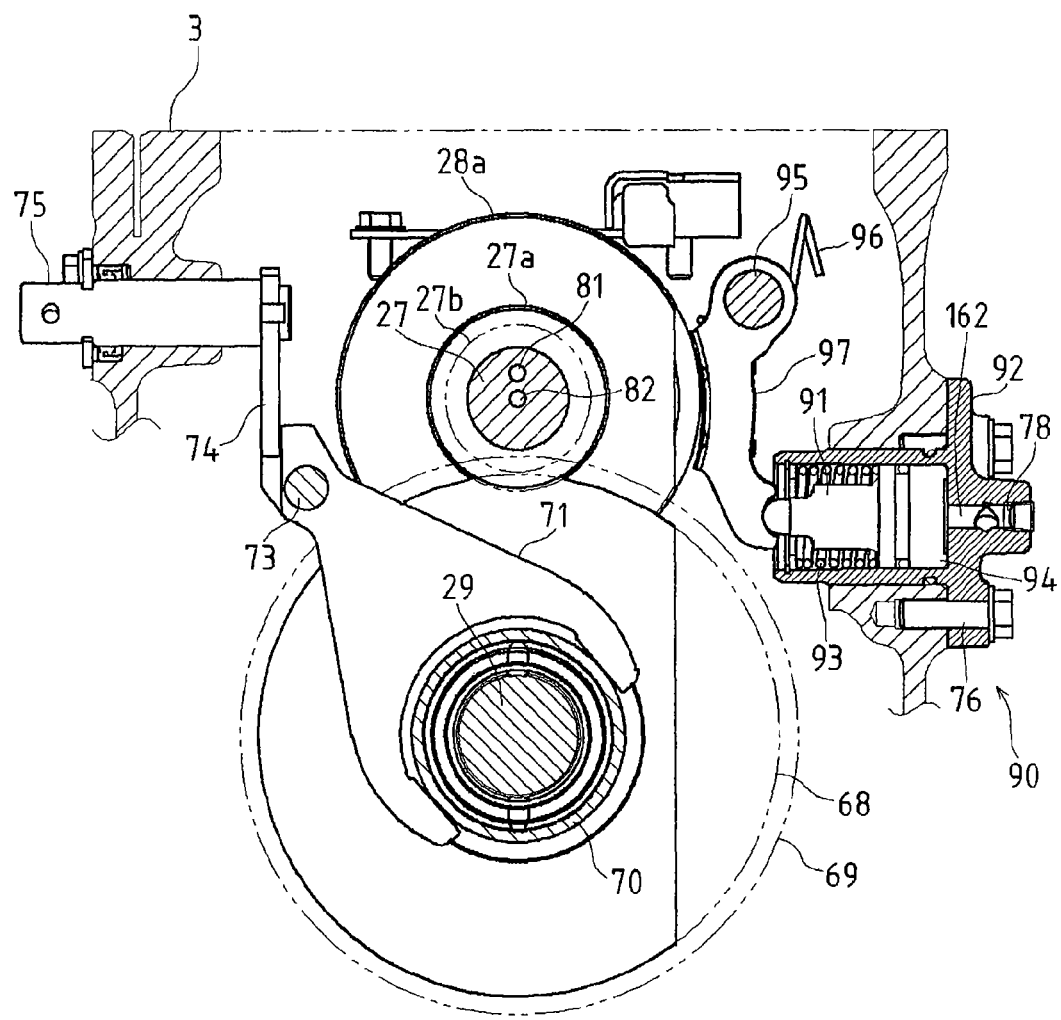
FIG. 3 It is a sectional front view of the same.

As shown in FIG. 3, a PTO brake mechanism 90 is provided which brakes the clutch housing 28a at the disengaged state of the PTO clutch 28 so as to stop inertia rotation of driven side of the PTO clutch 28 rapidly and to prevent drag of the frictional elements by lubricating oil. Namely, a brake shaft 95 in parallel to the transmission shaft 26 is provided and both ends thereof are supported by the support wall 32 and the PTO rear cover 3c. A brake shoe 97 is supported by the brake shaft 95 so as to be rotatable to touch or apart from the outer peripheral surface of the clutch housing 28a. The brake shoe 97 is wound around the brake shaft 95 and rotatively biased to apart from the clutch housing 28a by a torque spring 96, while one of ends of the torque spring 96 is engaged with the brake shoe 97 and the other end thereof is engaged with the upper surface of the support wall 32.

A hydraulic cylinder 92 whose outer end is closed is inserted oil-tightly into a hole formed in one of side walls of the rear housing 3 and fixed to the side wall by bolts 76. A piston 91 engaged with the hydraulic cylinder 92 touches the free end of the brake shoe 97 at the tip thereof. The piston 91 is movingly biased rearward by a spring 93 provided in the hydraulic cylinder 92, and an oil chamber 94 is provided in the hydraulic cylinder 92 so as to move the piston 91 forward. By oil pressure acting on the oil chamber 94, the piston 91 is moved forward so as to press the hydraulic cylinder 92 to the clutch housing 28a, whereby the PTO brake mechanism 90 is operated. An oil passage 78 is formed in the side wall of the rear housing 3 and is opened to the oil chamber 94 so that oil pressure acts on the oil chamber 94 through the oil passage 78 at the disengaged state of the PTO clutch 28.

As shown in FIG. 3, a fork shaft 73 is in parallel to the PTO shaft 29, and both ends of the fork shaft 73 are slidably supported by the support wall 32 and the PTO rear cover 3c. The shifter fork 71 of the PTO transmission 30 is fixedly supported by the fork shaft 73. A rotary operation shaft 75 penetrates the side wall of the rear housing 3, and an arm 74 attached to the inner end of the rotary operation shaft 75 is engaged with the fork shaft 73. The outer end of the rotary operation shaft 75 is connected to an operation lever (not shown), and by operating the rotary operation shaft 75 rotatively, the shifter fork 71 and the fork shaft 73 are slidingly displaced so as to obtain required displacement of the shifter sleeve 70.

Figure 4:
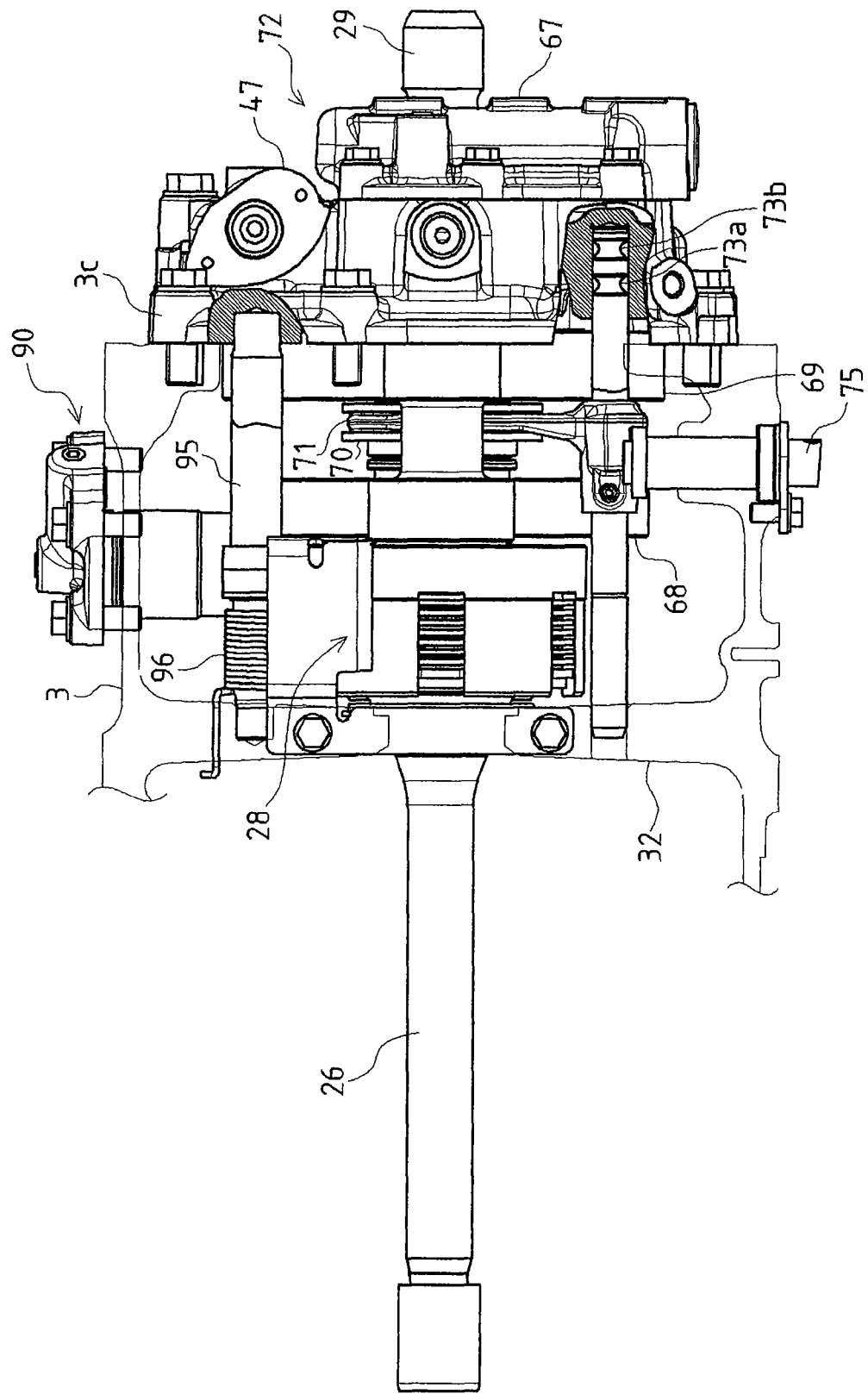
FIG. 4 It is a plan view of the same.
Figure 8:
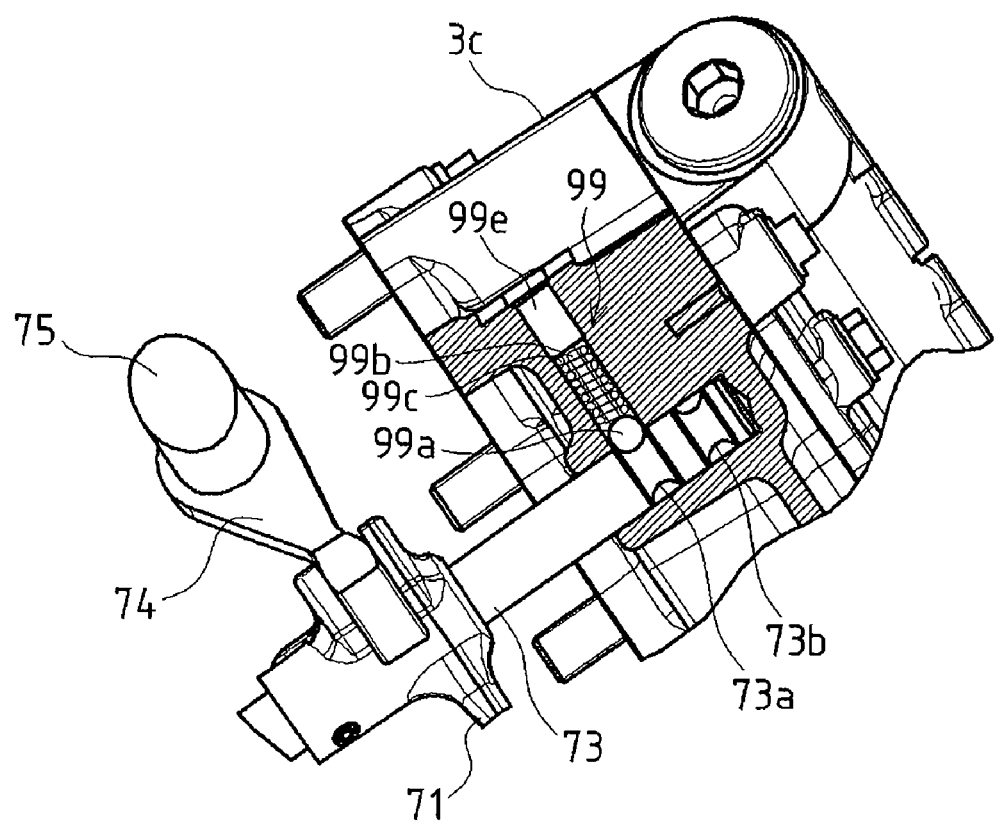
FIG. 8 It is an arrow sectional view of the line F-F in FIG. 5.

As shown in FIGS. 4 and 8, detent mechanism 99 is attached to the fork shaft 73 so as to hold the slide displacement of the fork shaft 73 at the engaged state of the PTO clutch 28. With regard to the detent mechanism 99, two ringlike grooves 73a and 73b are formed on the peripheral surface of the fork shaft 73, and a ball 99a is provided in the PTO rear cover 3c and biased by a spring 99c on a rod 99b. The ball 99a faces to one of the grooves 73a and 73b selectively.

The basal end of the spring 99c is received and covered by a bolt 99e screwed into the hole of the PTO rear cover 3c. By biasing force of the spring 99c, the ball 99a is pressed to the rod 99b. Accordingly, the ball 99a is engaged with one of the grooves 73a and 73b so that the fork shaft 73 is not slidingly displaced easily. Therefore, when an operator operates a PTO speed change lever, the fork shaft 73 is slid and held at the first speed stage position or the second speed stage position by the detent mechanism 99.

Next, explanation will be given on PTO valve equipment 72 which is the first mode of the present invention.

Figure 5:
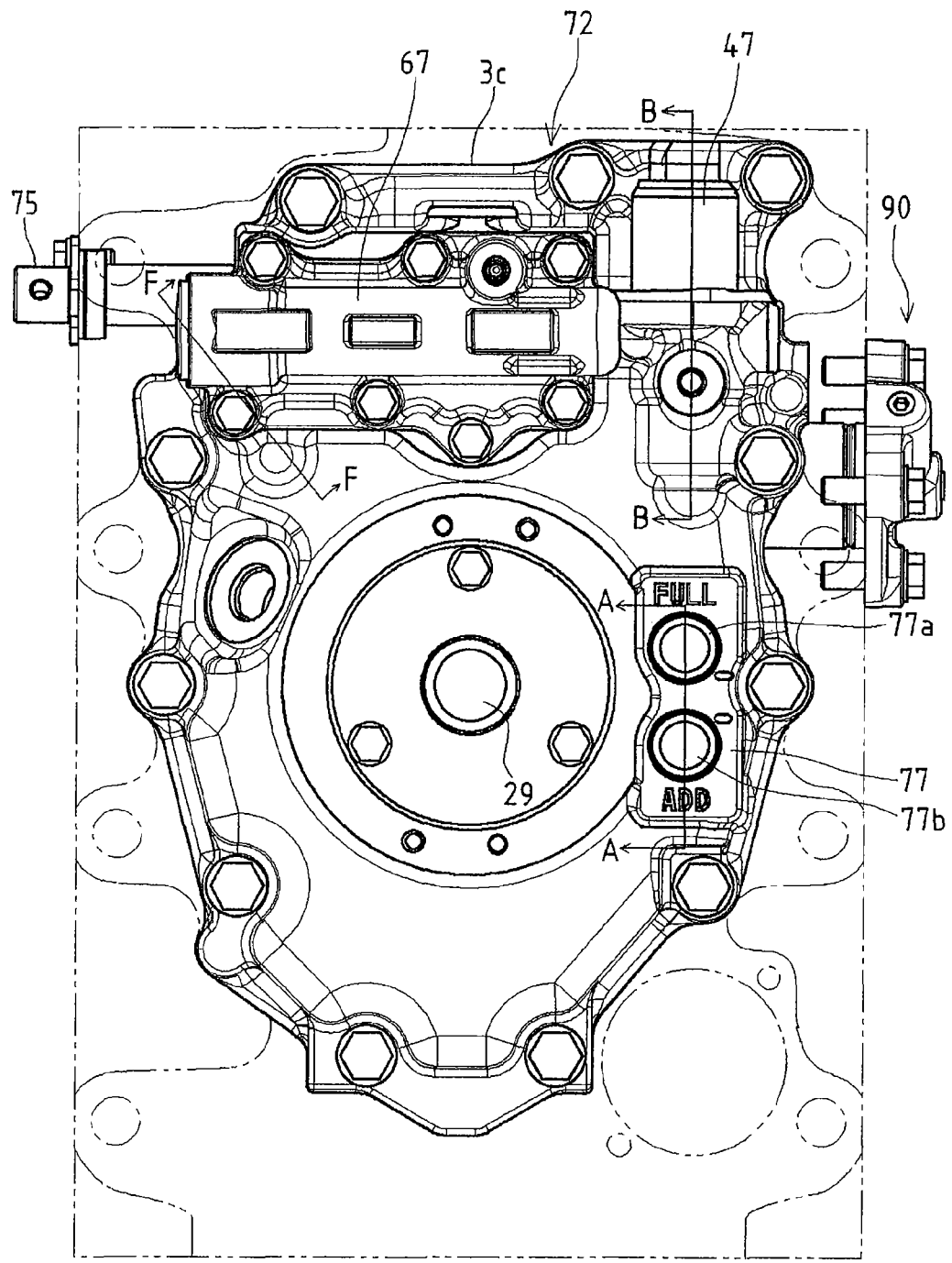
FIG. 5 It is a front view of the same.
Figure 6:
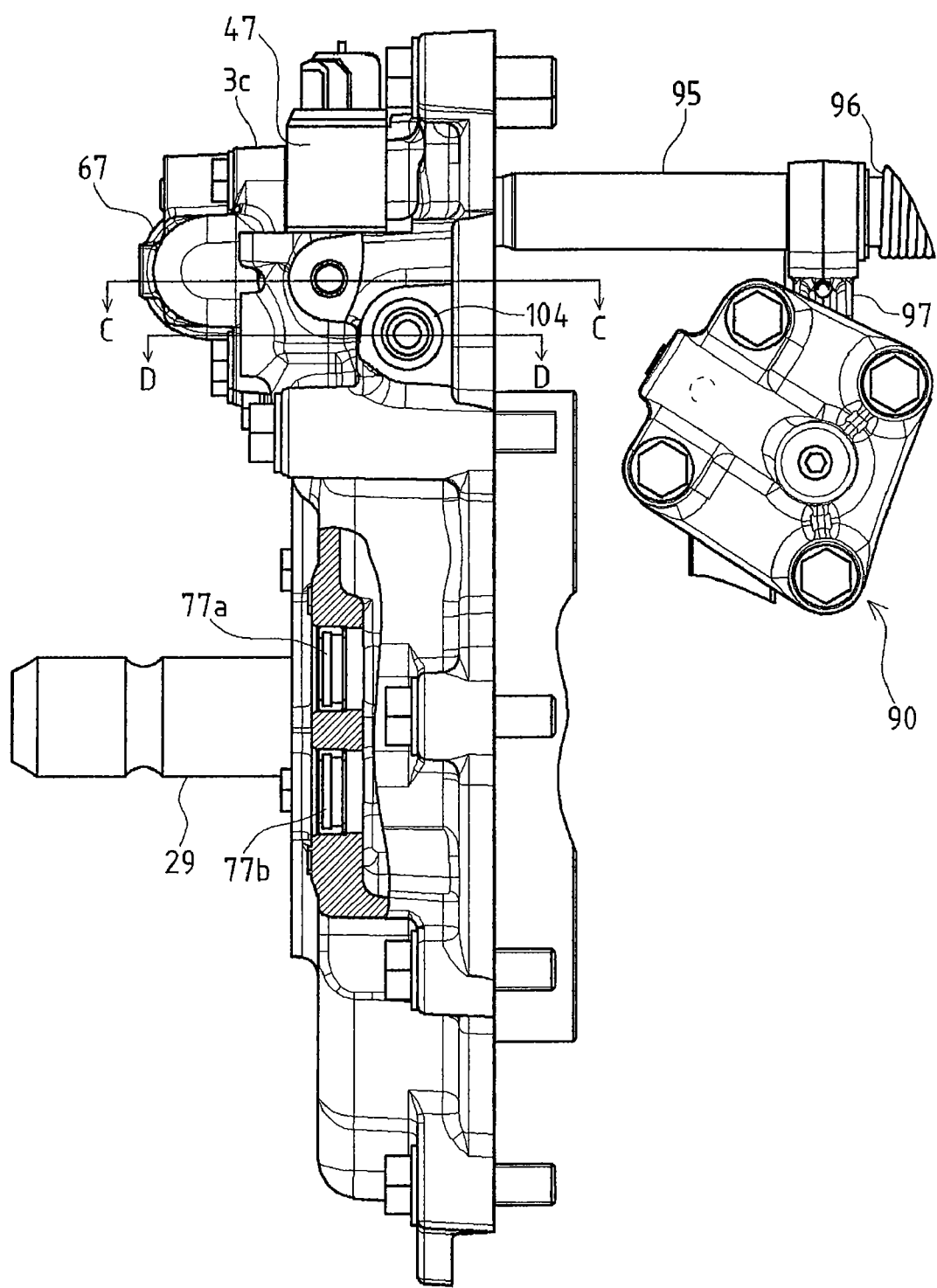
FIG. 6 It is an arrow sectional view of the line A-A in FIG. 5.
Figure 7:
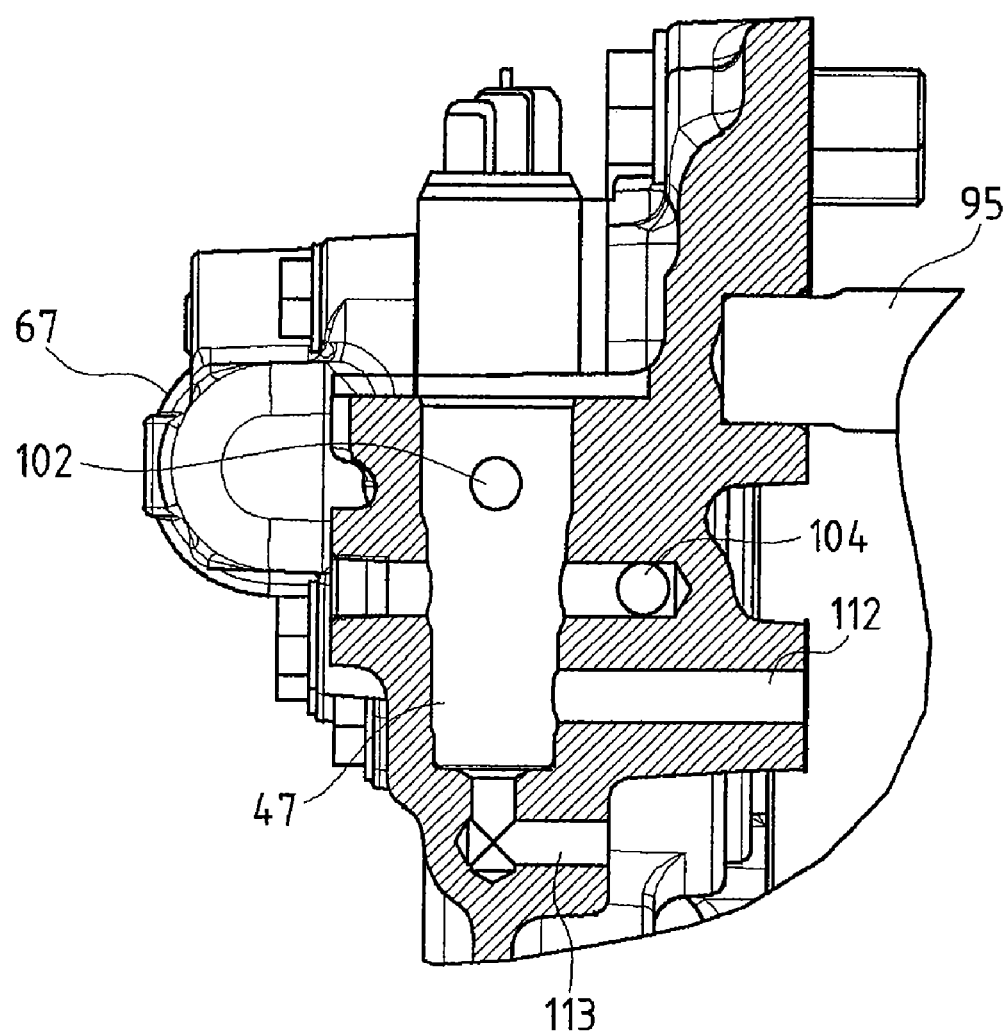
FIG. 7 It is an arrow sectional view of the line B-B in FIG. 5.

As shown in FIGS. 5, 6 and 7, the PTO valve equipment 72 as hydraulic valve equipment is provided integrally in the PTO rear cover 3c. The PTO valve equipment 72 comprises a modulate relief valve 67 arranged laterally in the upper portion of the PTO rear cover 3c and an electromagnetic directional control valve 47 arranged in the upper portion of the PTO rear cover 3c, at the side of the modulate relief valve 67.

As shown in FIG. 5, an inspection window 77 is formed on the PTO rear cover 3c, at the side of the PTO shaft 29 so that amount of pressure oil (lubricating oil) in the housing (transmission casing) can be inspected through the inspection window 77. The inspection window 77 comprises circular glasses 77a and 77b arranged vertically. When the oil surface can be seen through the lower glass 77b, pressure oil must be supplied. When the oil surface can be seen through the upper glass 77a, the amount of oil is appropriate. Then, the amount of oil can be checked easily. Accordingly, the inspection window 77 can be seen from back so that the amount of oil can be checked easily without inserting and pulling out an oil dip stick or the like. However, it may alternatively be constructed so that one inspection glass long in vertical direction is provided and lines indicating the appropriate amount and the insufficiency of oil, and the shape and number of the glass of the window are not limited.

Figure 9:
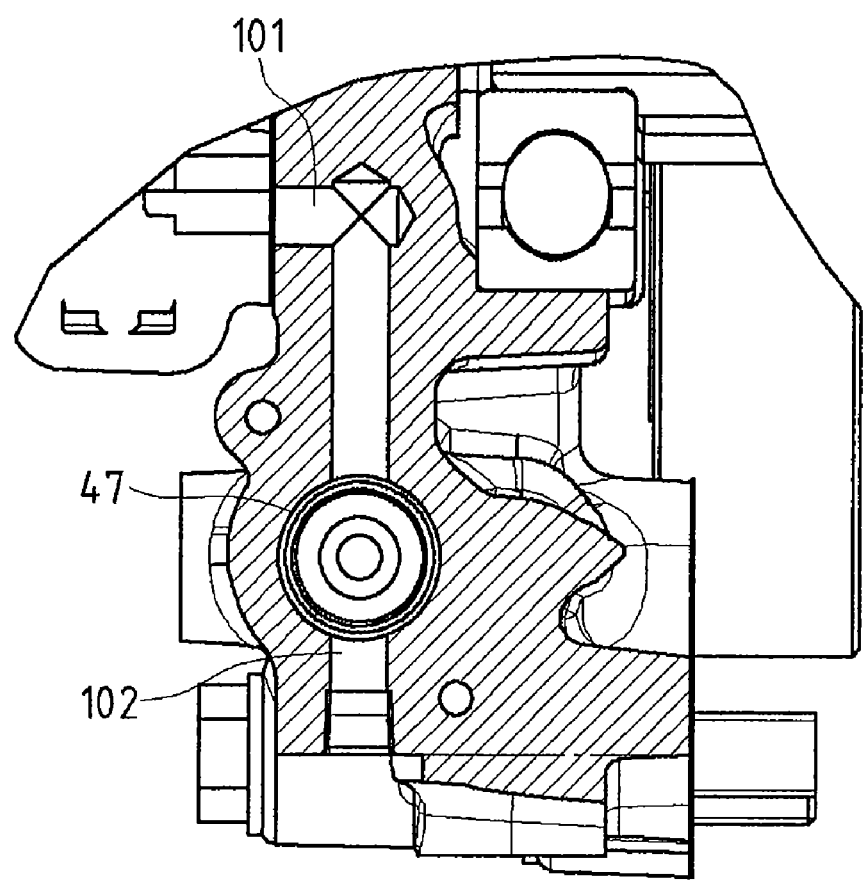
FIG. 9 It is an arrow sectional view of the line C-C in FIG. 6.
Figure 10:
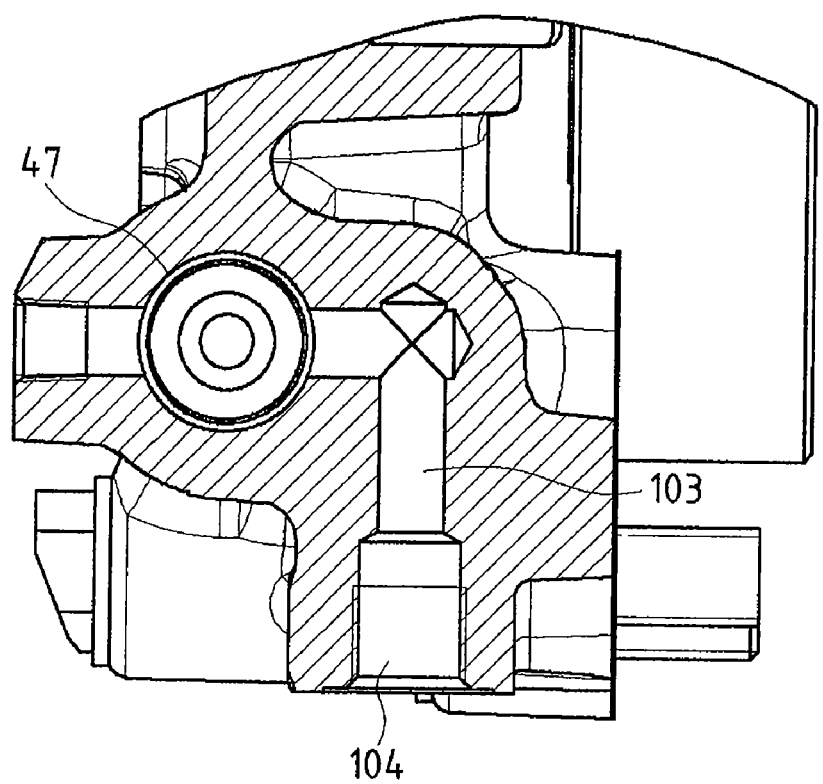
FIG. 10 It is an arrow sectional view of the line D-D in FIG. 6.

As shown in FIGS. 7, 9 and 10, the electromagnetic directional control valve 47 is provided vertically in the PTO rear cover 3c and communicated with the hydraulic cylinder 92 of the PTO brake mechanism 90 through an oil passage 103 formed at the vertical center of the electromagnetic directional control valve 47, in the PTO rear cover 3c and a port 104. An oil passage 112 is formed forward from the lower portion of the electromagnetic directional control valve 47, and pressure oil from a hydraulic pump is pressed to the oil passage 112 as a pump port. An oil passage 113 is formed below the electromagnetic directional control valve 47 and is communicated with the inside of the housing. An oil passage 101 is formed laterally, above the electromagnetic directional control valve 47, and is communicated with the modulate relief valve 67 discussed later. By the electromagnetic directional control valve 47 and the oil passage construction communicated therewith, oil passage communicated with the PTO clutch 28 or the PTO brake mechanism 90 can be switched.

As mentioned above, the PTO valve equipment 72 is provided integrally with the PTO rear cover 3c, and the oil passage and oil port communicating the PTO valve equipment 72 with the PTO clutch 28 is formed inside the PTO rear cover, whereby the hydraulic PTO clutch is modularized. Namely, a PTO rear cover to which a hydraulic PTO clutch is attached and a PTO rear cover to which a mechanical selector can be replaced with each other so as to change the spec easily, whereby the same housing can be used commonly so as to reduce part number. The maintenance work can be performed from back easily with few attachment and disassembly of surrounding apparatuses. The PTO valve equipment 72 for the switch control can be arranged close to the PTO clutch 28 so as to shorten the oil passage, whereby loss of oil pressure is reduced and responsibility is improved so as to stabilize oil pressure control.

Figure 11:
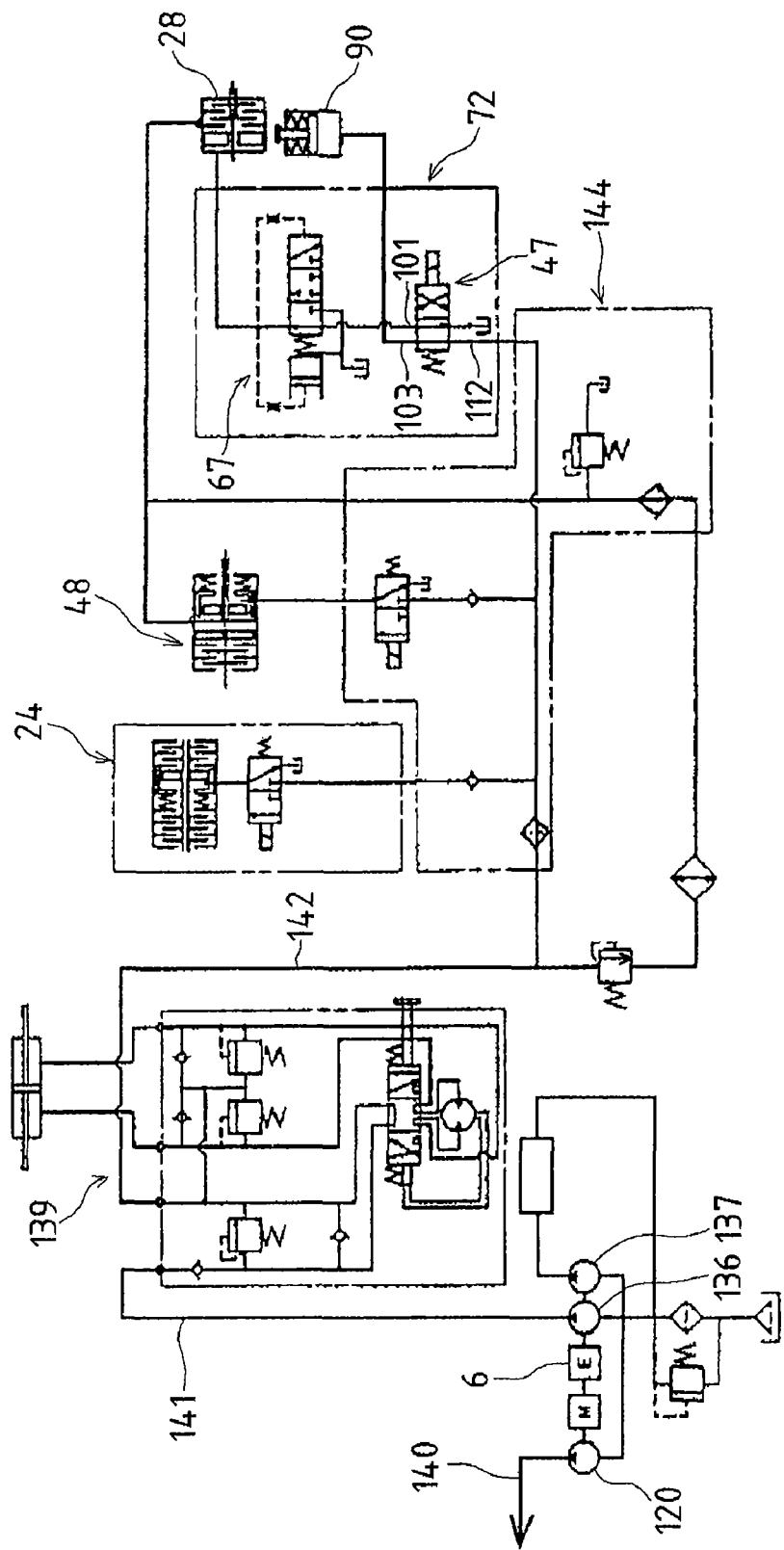
FIG. 11 It is a hydraulic circuit diagram of the tractor.

FIG. 11 shows an example of a hydraulic circuit of a working vehicle having the PTO valve equipment 72. Hydraulic pumps 120, 136 and 137 driven by the engine 6 are provided in the hydraulic circuit. The hydraulic pump 120 supplies oil pressure from a circuit 140 to the hydraulic clutches 40F and 40R of the forward/rearward travel selector 10. The hydraulic pump 136 supplies oil pressure to a switch valve of power steering mechanism 139 assisting the steering of the left and right front wheel. The excess oil from the hydraulic pump 136 is supplied through an oil passage 142, an ON/OFF valve 144, the front wheel driving clutch 24, the high/low speed selector clutch 48 and the PTO valve equipment 72 for the sub speed change to the PTO clutch 28 and the PTO brake mechanism 90. The hydraulic pump 137 supplies oil pressure to a hydraulic cylinder and an external actuator attached to the tractor for vertical movement. Furthermore, the hydraulic pump 137 supplies lubricating oil through a relief valve to the frictional disc parts of the high/low speed selector clutch 48 and the PTO clutch 28.

Pressure oil sent to the oil passage 142 is sent to the oil passage 112 of the PTO valve equipment 72. When the PTO shaft 29 is not driven, the electromagnetic directional control valve 47 is switched so as to send oil to the PTO brake mechanism 90. Accordingly, the piston is extended so as to make the brake shoe 97 touch the outer peripheral surface of the clutch housing 28a and brake it, whereby the inertial rotation is prevented. When the PTO lever is operated to the actuation side or the PTO switch is turned on, a solenoid of the electromagnetic directional control valve 47 is actuated and switched so as to supply pressure oil to the modulate relief valve 67, whereby the PTO clutch 28 is actuated and power is transmitted to the PTO shaft 29 so as to drive it.

Next, explanation will be given on control valve equipment 269 which is the second mode of the present invention. In addition, with regard to the second mode discussed below, a front housing 201, a support wall 201a, a first driving shaft 208, a forward/rearward travel selector 210 and a hydraulic clutch 240 are respectively constructed similarly to the front housing 1, the support wall 1a, the first driving shaft 8, the forward/rearward travel selector 10 and the hydraulic clutch 40 in FIG. 1. The other construction is also similar and detailed description thereof is omitted.

Figure 12:
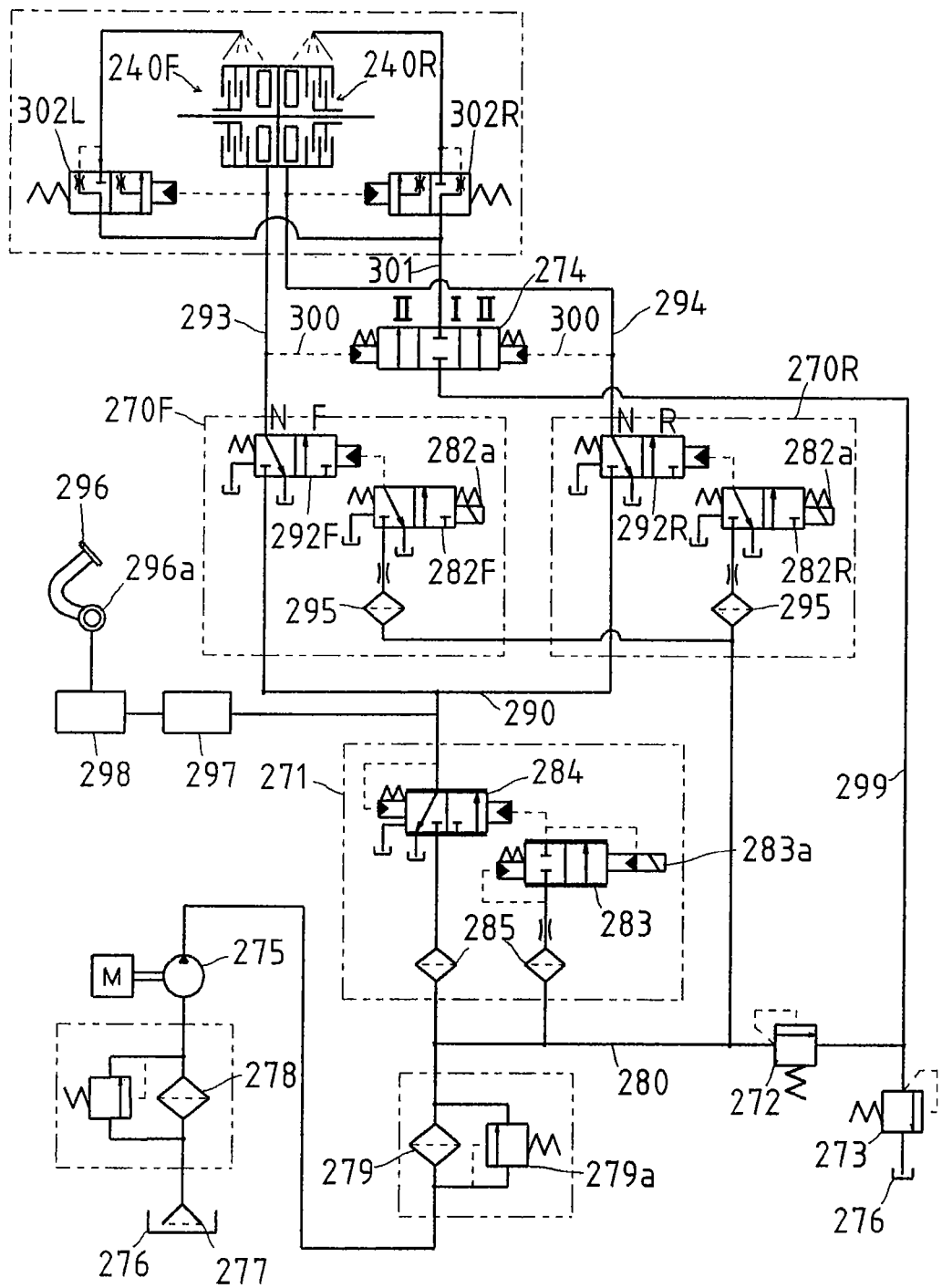
FIG. 12 It is a circuit diagram of a hydraulic circuit disposed in the tractor and the control valve equipment in FIG. 1.

See the hydraulic circuit diagram in FIG. 12, the control valve equipment 269 as hydraulic valve equipment comprises a forward travel ON/OFF valve 270F controlling on/off of supply of oil pressure to a forward travel hydraulic clutch 240F of the forward/rearward travel selector 210, and a rearward travel ON/OFF valve 270R controlling on/off of supply of oil pressure to a rearward travel hydraulic clutch 240R. An oil pump 275 supplying pressure oil to the forward travel hydraulic clutch 240F and the rearward travel hydraulic clutch 240R is internal gear type having the first driving shaft 208 as a pump shaft and is attached to the front surface of the support wall 201a. The oil pump 275 sucks oil from an oil sump 275 through a filter 278 by a strainer 277. A line filter 279 is disposed in the discharge port of the oil pump 275 and a bypass valve 279a is disposed in parallel to the line filter 279 so that the oil pump 275 discharges pressure oil in constant pressure.

Figure 14:
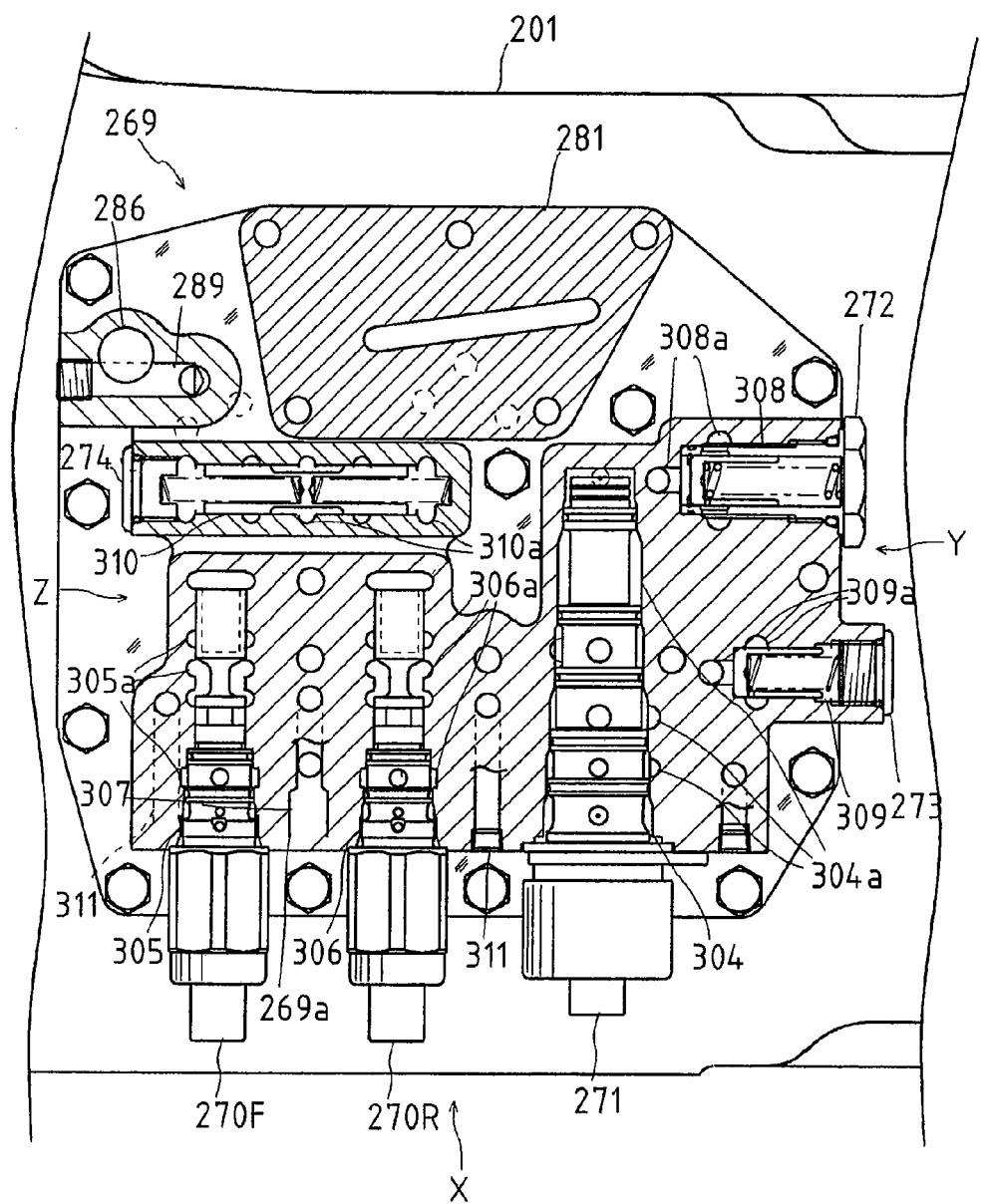
FIG. 14 It is a sectional side view partially developed of the control valve equipment arranged on an outer side wall of a vehicle body frame of the tractor.
Figure 15:
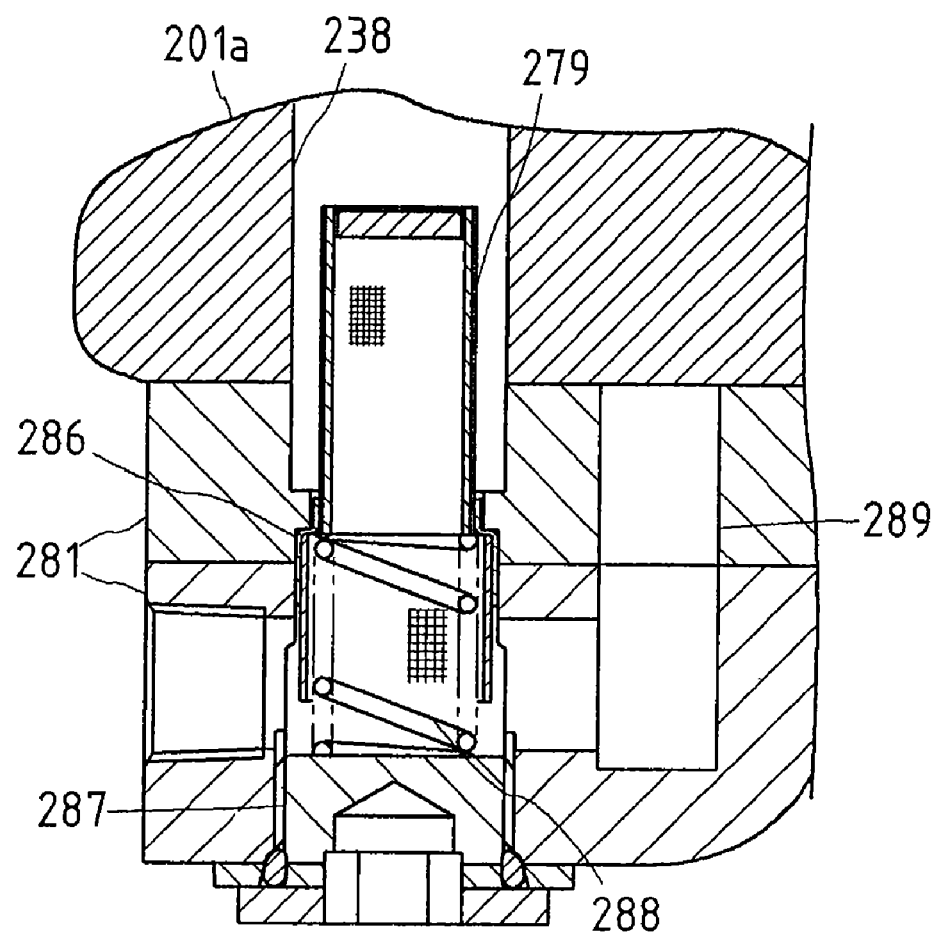
FIG. 15 It is a plan view partially developed of a line filter in FIG. 4.

Explanation will be given on the line filter 279 in detail. As shown in FIGS. 14 and 15, an oil discharge passage 238 from the oil pump 275 is bored in the support wall 201a. The oil discharge passage 238 is communicated with a through-hole 286 penetrating laterally the front end of the control valve equipment 269 from the support wall 201a. The line filter 279 is inserted into the through-hole 286 and is biased so as to be movable in the through-hole 286 by a coil spring 288. The basal end of the coil spring 288 is received by a screw plug 287 screwed to the control valve equipment 269 so as to close the through-hole 286. The through-hole 286 is communicated with a pump port 289 bored in the control valve equipment 269.

When the line filter 279 has been clogged as with the use and then the difference of pressure between the upstream and downstream sides of the filter reaches a fixed value, the line filter 279 is moved by oil pressure acting on the inner end thereof against biasing force of the coil spring 288 so as to connect the oil discharge passage 238 directly to the pump port 289. Accordingly, the clogged line filter 279 acts as a bypass valve. Then, even if the clogging occurs, supply of oil to the forward travel hydraulic clutch 240F and the rearward travel hydraulic clutch 240R does not become insufficient, and over load is not applied on the oil pump 275.

Oil from the oil pump 275 is introduced through the through-hole 286 and the pump port 289 into an oil passage 280 bored in the control valve equipment 269. The oil passage 280 is communicated with a proportional valve 271, a forward travel solenoid controlled pilot operated valve 282F of the forward travel ON/OFF valve 270F, a rearward travel solenoid controlled pilot operated valve 282R of the rearward travel ON/OFF valve 270R, and a regulating valve 273.

The proportional valve 271 comprises a solenoid controlled pilot operated valve 283 and a pilot operated valve 284. Pressure oil from the oil passage 280 is sent through filters 285 to the solenoid controlled pilot operated valve 283 and the pilot operated valve 284 in the proportional valve 271. The solenoid controlled pilot operated valve 283 has the close position closing the oil passage and the open position opening the oil passage. The solenoid controlled pilot operated valve 283 is biased to the close position by a valve spring and pressure oil above the solenoid controlled pilot operated valve 283 received by a pilot oil passage. The solenoid controlled pilot operated valve 283 is switched to the open position by a solenoid 283a opposite to the valve spring.

The pilot operated valve 284 has the close position closing the oil passage and the open position opening the oil passage, and is biased to the close position by a valve spring and pressure oil below the valve 284. The pilot operated valve 284 is communicated through an oil passage 290 to a forward travel pilot operated valve 292F of the forward travel ON/OFF valve 270F and a rearward travel pilot operated valve 292R of the rearward travel ON/OFF valve 270R. When the solenoid 283a is operated and the solenoid controlled pilot operated valve 283 is switched to the open position, pressure oil enters the solenoid controlled pilot operated valve 283, and the pilot operated valve 284 is switched to the open position through the pilot oil passage. By disposing the solenoid controlled pilot operated valve 283, shock by switching the pilot operated valve 284 is eased when flow rate of pressure oil sent from the oil passage 280 through the pilot operated valve 284 to the oil passage 290 is large or comparatively small.

Flow rate of pressure oil in this embodiment is controlled by a position sensor 296a disposed near a rotary axis of a clutch pedal 296 and a pressure switch 297 connected to the oil passage 290. With regard to the proportional valve 271, the position sensor 296a detects the rotation of the clutch pedal 296, and in proportion to this rotation, the solenoid controlled pilot operated valve 283 is opened and closed so as to send pilot oil to the operation part of the pilot operated valve 284. Accordingly, the pilot operated valve 284 is opened and closed so as to control flow rate of oil flowing through the pilot operated valve 284 to the forward/rearward travel selector 210. Namely, when the clutch pedal 296 is treaded for the maximum stroke, the pilot operated valve 284 is set to be in the close position and oil does not flow to the forward/rearward travel selector 210. By releasing the clutch pedal 296 gradually, the proportional valve 271 (the pilot operated valve 284) is opened in proportion to the treaded amount, and pressure oil flows from the oil passage 280 through the proportional valve 271 to the oil passage 290. Then, when the clutch pedal 296 is released thoroughly, pressure oil flows to the forward/rearward travel selector 210 at the forward or rearward operation position. At this time, oil pressure in the oil passage 290 at the outlet side of the proportional valve 271 is detected by the pressure switch 297 as a pressure detection means so as to detect whether appropriate pressure is outputted or not.

The operation of tread and release of the clutch pedal 296 is different with each operator, and sudden operation may cause damage to the clutch and the like and may cause sudden starting. Accordingly, a controller 298 controls based on the rotation angle of the clutch pedal 296 so that the controller 298 calculates the variation of value of the position sensor 296a, and when the tread of the clutch pedal 296 is released suddenly, the solenoid 283a is switched gradually so that the oil passages 280 and 290 are communicated with each other gradually, whereby the oil pressure in the oil passage 290 is controlled so as to prevent the sudden starting of the working vehicle.

The forward travel ON/OFF valve 270F comprises the forward travel solenoid controlled pilot operated valve 282F and the forward travel pilot operated valve 292F, and the rearward travel ON/OFF valve 270R comprises the rearward travel solenoid controlled pilot operated valve 282R and the rearward travel pilot operated valve 292R. Pressure oil from the oil pump 275 is sent through the oil passage 280 and filters 295 to the forward travel solenoid controlled pilot operated valve 282F and the rearward travel solenoid controlled pilot operated valve 282R respectively. Pressure oil from the proportional valve 271 is sent through the oil passage 290 to the forward travel pilot operated valve 292F and the rearward travel pilot operated valve 292R respectively.

The forward travel solenoid controlled pilot operated valve 282F (rearward travel solenoid controlled pilot operated valve 282R) has the close position closing the oil passage and the open position opening the oil passage. The valve 282F is biased to the close position by a valve spring and can be switched to the open position by a solenoid 282a (solenoid 282a) from the side opposite to the valve spring. When the solenoid 282a (solenoid 282a) is operated so as to switch the forward travel solenoid controlled pilot operated valve 282F (rearward travel solenoid controlled pilot operated valve 282R) to the open position, pressure oil is sent into the forward travel solenoid controlled pilot operated valve 282F (rearward travel solenoid controlled pilot operated valve 282R) and the forward travel pilot operated valve 292F (rearward travel pilot operated valve 292R) is switched by the oil pressure thereof through the pilot oil passage.

The forward travel pilot operated valve 292F (rearward travel pilot operated valve 292R) has the neutral position N disengaging the hydraulic clutch 240F (hydraulic clutch 240R) and the forward travel action position F (rearward travel action position R) selectively operating the hydraulic clutch 240F (hydraulic clutch 240R), and is biased to the neutral position N by pressure oil of a valve spring. The forward travel pilot operated valve 292F (rearward travel pilot operated valve 292R) is communicated through an oil passage 293 (oil passage 294) with the hydraulic clutch 240F (hydraulic clutch 240R). Accordingly, by disposing the forward travel solenoid controlled pilot operated valve 282F (rearward travel solenoid controlled pilot operated valve 282R), shock at the time of switching the forward travel pilot operated valve 292F (rearward travel pilot operated valve 292R) can be eased in the case that pressure oil of large flow rate is sent from the oil passage 290 to the oil passage 293 (oil passage 294) through the forward travel pilot operated valve 292F (rearward travel pilot operated valve 292R) or the flow rate is comparatively small.

The solenoid 282a (solenoid 282a) of the forward travel solenoid controlled pilot operated valve 282F (rearward travel solenoid controlled pilot operated valve 282R) is operated to be switched by a forward/rearward travel switch lever (not shown). For example, when the forward/rearward travel switch lever is at the forward travel position, the solenoid 282a of the forward travel solenoid controlled pilot operated valve 282F is operated so as to switch the forward travel solenoid controlled pilot operated valve 282F to the open position. Then, through the pilot oil passage, the forward travel pilot operated valve 292F is switched to the forward travel action position F so that the oil passage 290 is communicated with the oil passage 293 through the forward travel pilot operated valve 292F. In addition, when the forward/rearward travel switch lever is at the rearward travel position, the solenoid 282a of the rearward travel solenoid controlled pilot operated valve 282R is operated so as to switch the rearward travel pilot operated valve 292R to the rearward travel action position R through the pilot oil passage.

A main relief valve 272 is disposed below the line filter 279, at the middle of the oil passage 280. A relief oil passage 299 from the main relief valve 272 is directed to the hydraulic clutches 240F and 240R so as to supply lubricating oil to discs (not shown) of the hydraulic clutches 240F and 240R. The regulating valve 273 is disposed at the middle of the oil passage 299, and lubricating oil sent from the main relief valve 272 to the oil passage 299 is drained to an oil sump 276 in the vehicle body housing by the regulating valve 273. Then, by the difference of pressure between the main relief valve 272 and the regulating valve 273, flow rate of lubricating oil supplied to the oil passage 299 is regulated.

A shuttle valve 274 is disposed in the downstream side of the oil passage 299. The shuttle valve 274 is biased to the neutral position I closing the oil passage 299 by valve springs of both sides, and is switched to the open position II opening the oil passage 299 by receiving oil pressure of pilot oil passages 300 connected to the oil passages 293 and 294. Namely, by receiving oil pressure of the oil passage 293 from the forward travel ON/OFF valve 270F through the pilot oil passages 300, the shuttle valve 274 is switched from the neutral position I to the open position II (moved rightward in FIG. 12). On the other hand, by receiving oil pressure of the oil passage 293 from the rearward travel ON/OFF valve 270R through the pilot oil passages 300, the shuttle valve 274 is switched from the neutral position I to the open position II (moved leftward in FIG. 12).

An oil passage 301 communicated with the shuttle valve 274 is bored across the control valve equipment 269 and the vehicle body frame (not shown) and branches into two directions so as to be communicated respectively with the forward travel hydraulic clutch 240F and the rearward travel hydraulic clutch 240R. A forward travel selector valve 302F and a rearward travel selector valve 302R are respectively disposed at the middles of the branched parts of the oil passage 301. The forward travel selector valve 302F (rearward travel selector valve 302R) is biased to the restriction position restricting flow rate of lubricating oil in the oil passage 301, and by receiving oil pressure of the oil passage 293 (oil passage 294) from the forward travel ON/OFF valve 270F (rearward travel ON/OFF valve 270R) through the pilot oil passage, the forward travel selector valve 302F (rearward travel selector valve 302R) is switched to the open position so that lubricating oil is sent.

When the shuttle valve 274 is released by oil pressure of the oil passages 293 and 294, lubricating oil sent from the main relief valve 272 through the relief oil passage 299 is sent to the oil passage 301 regardless of forward or rearward traveling. When the forward travel selector valve 302F and the rearward travel selector valve 302R are released by oil pressure of the oil passages 293 and 294, lubricating oil is supplied mainly to the forward travel hydraulic clutch 240F at the forward traveling, and is supplied mainly to the rearward travel hydraulic clutch 240R at the rearward traveling. Accordingly, the shuttle valve 274 and the selector valves 302F and 302R switched by receiving oil pressure through the pilot oil passage, whereby lubricating oil can be supplied to the hydraulic clutches 240F and 240R while controlling the flow rate thereof following the drive of the working vehicle.

Next, explanation will be given on the arrangement construction of the valves of the control valve equipment 269 below.

As shown in FIGS. 13 to 18, an attachment member 281 to which the valves of the control valve equipment 269 are attached is formed by one plate member which is substantially rectangular in shape when viewed from the side. The surface of the attachment member 281 touching the side surface of the front housing 201 is vertical substantially along the longitudinal direction, and the attachment member 281 adheres closely and is fixed to the left side outer surface of the front housing 201. By constructing the control valve equipment 269 with one plate-like attachment member 281, the lateral thickness of the control valve equipment 269 in the vehicle body frame can be reduced. Furthermore, the number of parts can be reduced so as to reduce production cost. The oil passage is bored in the control valve equipment 269 so as to be opened on the touching surface, whereby oil supplied from the oil pump 275 is collected therein and does not leak out.

The outer side surface of the attachment member 281 of the control valve equipment 269 is formed unevenly, and the forward travel ON/OFF valve 270F, the rearward travel ON/OFF valve 270R, the proportional valve 271, the main relief valve 272, the regulating valve 273, and the shuttle valve 274 are detachably inserted into the attachment member 281. In this embodiment, each of the valves is provided on substantially the same plane in parallel to the touching surface between the attachment member 281 and the front housing 201. According to this arrangement, the lateral thickness of the control valve equipment 269 can be reduced further so as to increase capacity of fuel tanks (not shown) disposed at the left and right of the vehicle body frame. In addition, with regard to the construction that any fuel tank is not disposed, the space between the outer side surface of the control valve equipment 269 and members of the vehicle body such as a step can be enlarged. Moreover, the hydraulic circuit can be bored compactly in the inside of the attachment member 281 or the side surface thereof at the side of vehicle body.

A plurality of attachment holes 304 and the like are bored in the lower, front or rear surface of the attachment member 281 so that the proportional valve 271, the forward travel ON/OFF valve 270F and the like are inserted into the holes. The attachment holes 304, 305 and 306 are bored upward in the lower side surface 269a of the control valve equipment 269 so that the proportional valve 271, the forward travel ON/OFF valve 270F and the rearward travel ON/OFF valve 270R are detachably inserted into the holes as the valves. Through-holes are bored laterally so as to be fixed to the side wall of the front housing 201 by screwing bolts, and bosses 303 are formed so as to reinforce the through-holes.

The main relief valve 272 and the regulating valve 273 are arranged vertically in parallel to each other, and the forward travel ON/OFF valve 270F and the rearward travel ON/OFF valve 270R are arranged longitudinally in parallel to each other. The main relief valve 272 and the regulating valve 273 are substantially orthogonal respectively to the forward travel ON/OFF valve 270F and the rearward travel ON/OFF valve 270R. In other words, the valves are arranged so that they radiate from the substantial center of the control valve equipment 269, and each of the valves is arranged in parallel to or orthogonal to each other. According to this arrangement, the optimum arrangement layout for minimizing the control valve equipment 269 can be obtained, and each of the valves can be detached easily. Though the attachment length of the electromagnetic valve is large and many openings connected to the oil passages must be provided, the space for detaching and attaching the valves can be secured.

The attachment holes 304, 305 and 306, to which the forward travel ON/OFF valve 270F, the rearward travel ON/OFF valve 270R, and the proportional valve 271 are attached, are bored in the control valve equipment 269. The attachment holes 304, 305 and 306 are bored upward from the lower side of the control valve equipment 269 (from the side of X in FIG. 13) substantially vertically so that the attachment holes 304, 305 and 306 are on the same plane substantially when viewed in rear. Then, the proportional valve 271 is inserted into the attachment hole 304, the forward travel ON/OFF valve 270F is inserted into the attachment hole 305, and the rearward travel ON/OFF valve 270R is inserted into the attachment hole 306 from the lower side of the control valve equipment 269. In addition, openings 304a, 305a and 306a are bored in the attachment holes 304, 305 and 306, respectively, so as to be in communication with the oil passage bored in the control valve equipment 269, whereby pressure oil from the oil pump 275 is supplied to each of the valves.

Since the proportional valve 271, the forward travel ON/OFF valve 270F and the rearward travel ON/OFF valve 270R can be detached from and attached to the lower side of the control valve equipment 269, these valves can be maintained easily. Namely, since the control valve equipment 269 is disposed on the outer side surface of the front housing 201 arranged at the front portion of the longitudinal vehicle body frame, it is difficult to detach the valves forward or upward. On the other hand, since the lower side of the working vehicle is opened, the valves can be detached downward easily.

Figure 16:
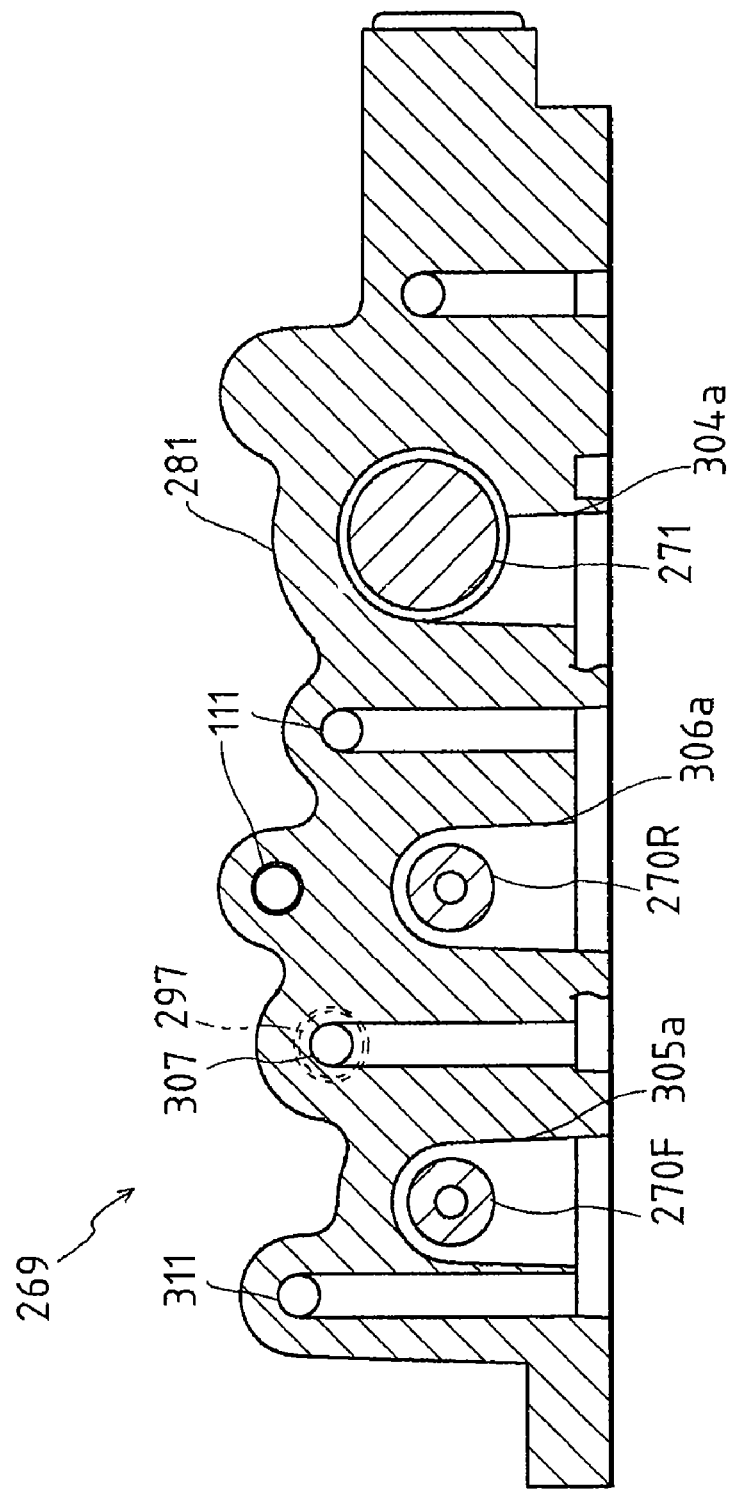
FIG. 16 It is an arrow sectional view of the line E-E in FIG. 13.

As shown in FIG. 16, the pressure switch 297 as the pressure detection means is disposed detachably in an attachment hole 307 bored upward, substantially vertically in the control valve equipment 269. Pressure measurement ports 311 are bored at the lower side (side of X) of the control valve equipment 269 so as to check and measure oil pressure in the forward travel ON/OFF valve 270F and the rearward travel ON/OFF valve 270R. Accordingly, the maintenance and replacement of the pressure switch 297 and various pressure measurements can be performed easily.

In addition, if the control valve equipment 269, in which the proportional valve 271, the forward travel ON/OFF valve 270F and the rearward travel ON/OFF valve 270R are arranged, is disposed in the outer side surface of the front housing 201, the tip of each of the proportional valve 271, the forward travel ON/OFF valve 270F and the rearward travel ON/OFF valve 270R is positioned above the lower end surface of the front housing 201 so as not to project from the lower end surface of the front housing 201, whereby damage to the tip of each of the proportional valve 271, the forward travel ON/OFF valve 270F and the rearward travel ON/OFF valve 270R is prevented (see FIG. 14).

Figure 17:
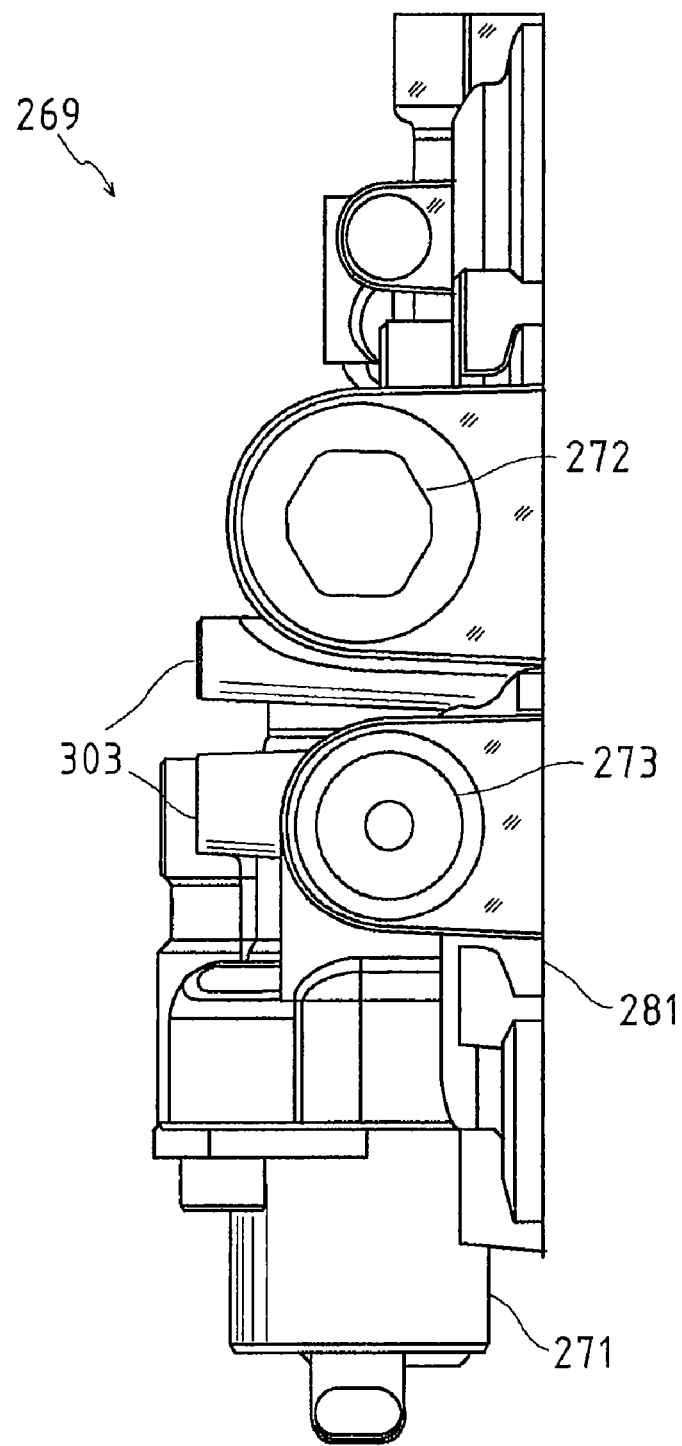
FIG. 17 It is a rear view of the control valve equipment.

As shown in FIGS. 14 and 17, attachment holes 308 and 309 to which the main relief valve 272 and the regulating valve 273 are respectively attached are bored forward from the rear side of the vehicle body frame (from the side of Y in FIG. 13) so that the attachment holes 308 and 309 are substantially on the same plane when viewed in plan. The main relief valve 272 and the regulating valve 273 are detachably inserted respectively into the attachment holes 308 and 309 from the front side of the control valve equipment 269. Openings 308a and 309a are bored respectively in the attachment holes 308 and 309 so as to be communicated with the oil passage bored in the control valve equipment 269, whereby pressure oil from the oil pump 275 is supplied to each of the valves.

Figure 13:
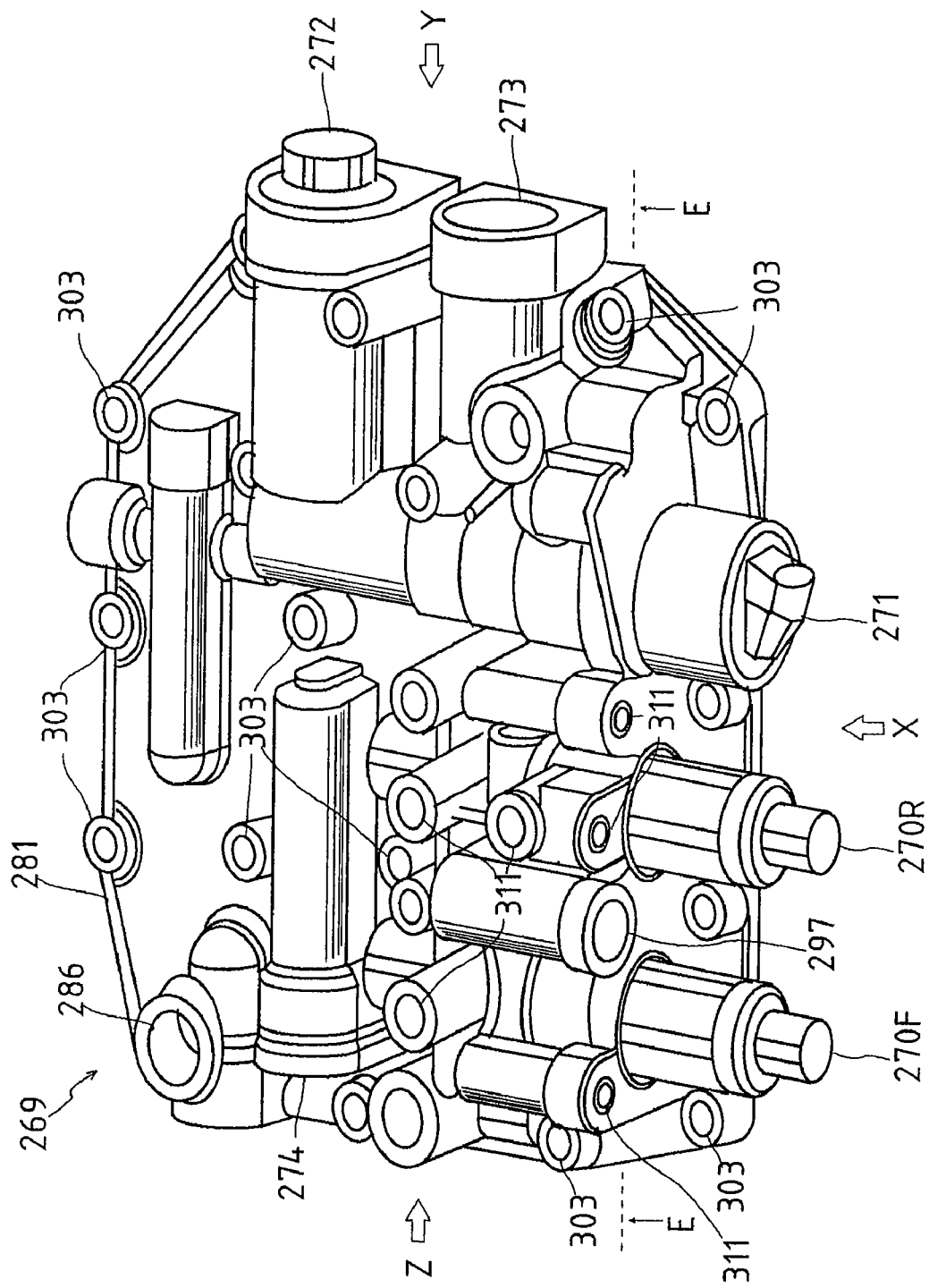
FIG. 13 It is a perspective front view of the control valve equipment according to the present invention.
Figure 18:
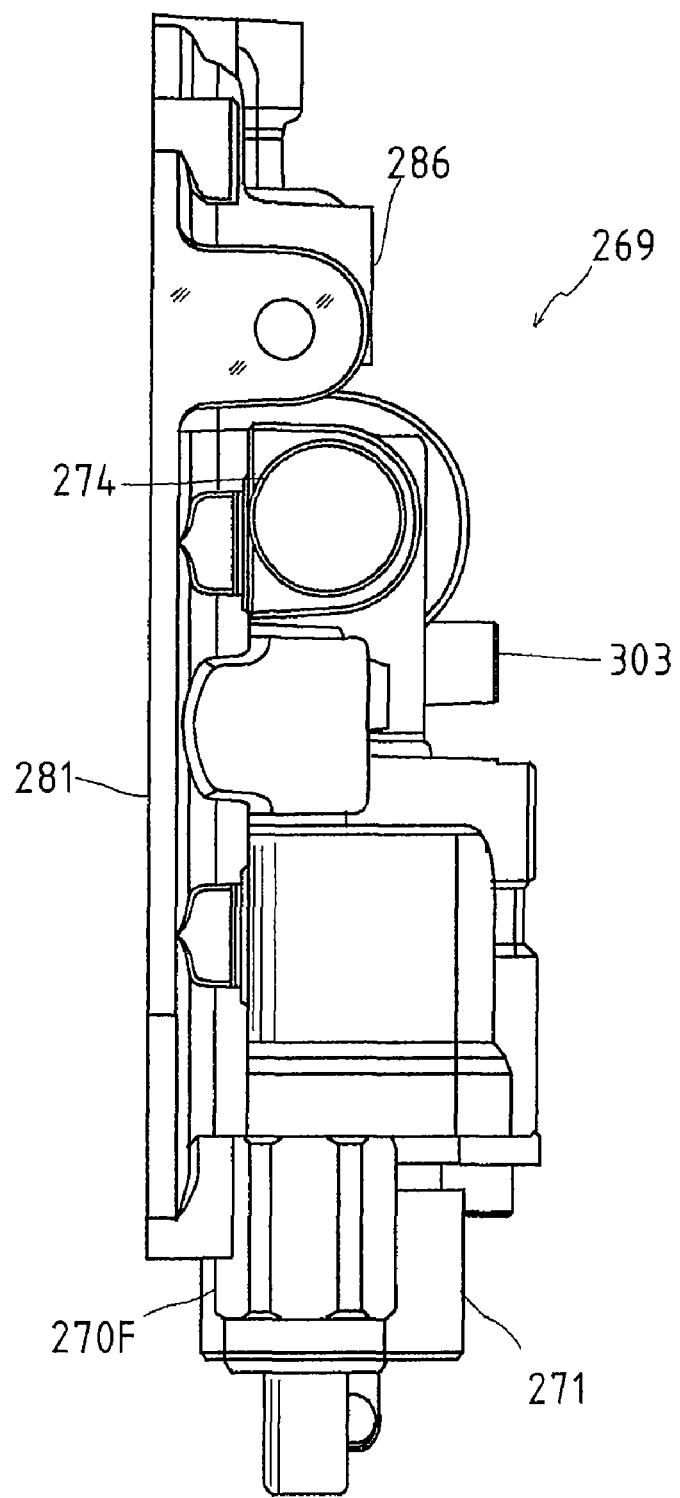
FIG. 18 It is a front view of the control valve equipment.
Figure 19:
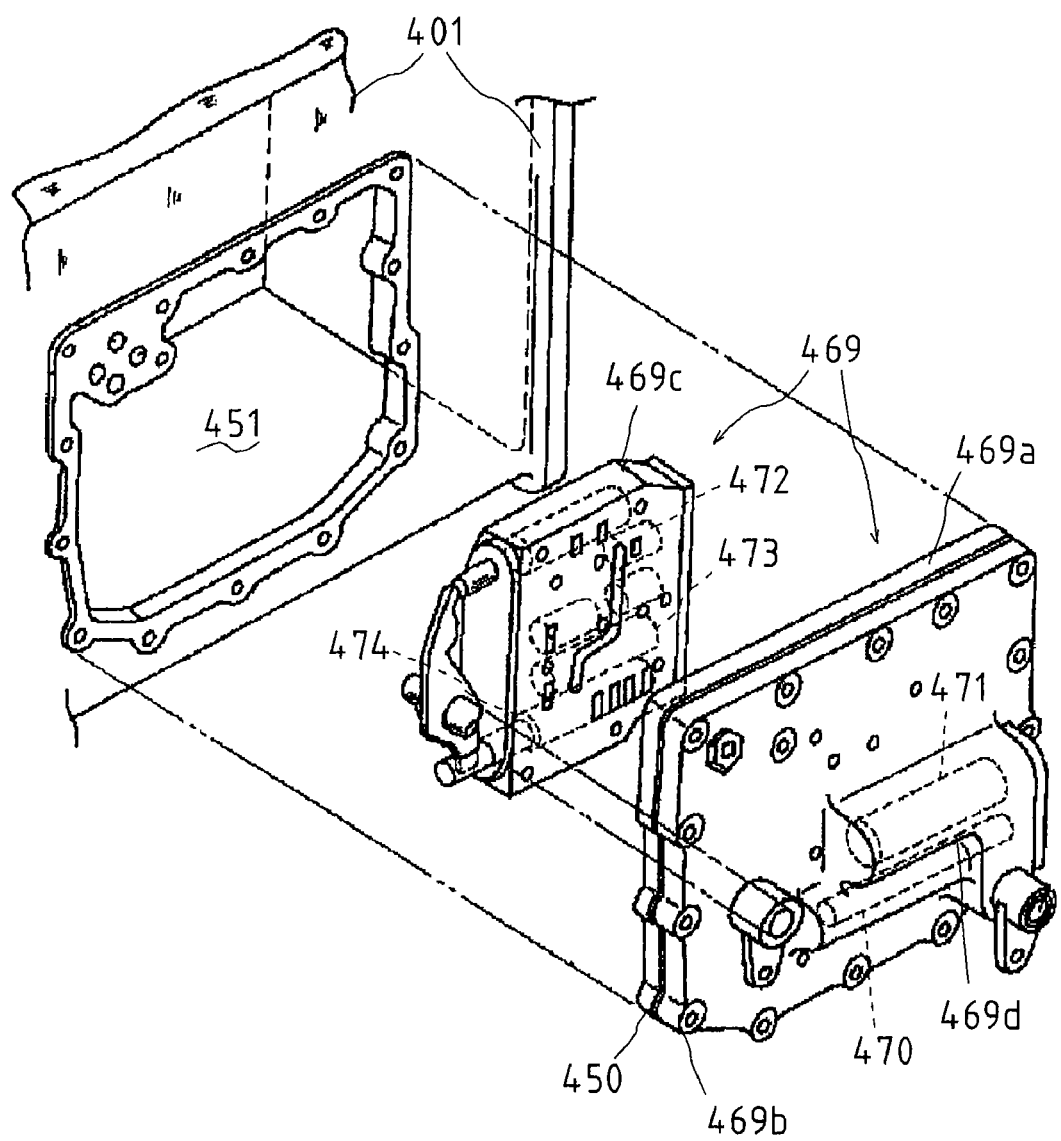
FIG. 19 It is a perspective deal drawing of conventional control valve equipment.

As shown in FIGS. 14 and 18, an attachment hole 310 to which the shuttle valve 274 is attached is bored rearward from the front side of the vehicle body frame (from the side of Z in FIG. 13). The shuttle valve 274 is detachably inserted into the attachment hole 310 from the front side of the control valve equipment 269. An opening 310a is bored in the attachment hole 310 so as to be in communication with the oil passage bored in the control valve equipment 269, whereby pressure oil from the oil pump 275 is supplied to each of the valves.

Accordingly, the main relief valve 272, the regulating valve 273 and the shuttle valve 274 can be attached and detached from the front side of the control valve equipment 269, whereby these valves can be exchanged from the outside easily without disassembling the control valve equipment 269. Compared with the proportional valve 271, the forward travel ON/OFF valve 270F and the rearward travel ON/OFF valve 270R require maintenance less frequently. Accordingly, these valves are arranged along the longitudinal direction of the vehicle body frame so as to give priority to the exchange of the proportional valve 271, the forward travel ON/OFF valve 270F and the rearward travel ON/OFF valve 270R. However, according to this arrangement, the lateral width of the vehicle body frame can be reduced and the volume of the control valve equipment 269 can be minimized.

In addition, the arrangement of the valves is not limited to that shown in FIGS. 13 and 14, and the valves may be arranged so as to have different vertical or longitudinal positions with respect to each other. Also, the kinds of the valves to be arranged are not limited to those described herein.

INDUSTRIAL APPLICABILITY

The present invention can be applied to a working vehicle, such as a tractor, so as to modularize many kinds of valves attached to a transmission casing arranged in the working vehicle, thereby improving the operability of the working vehicle.

What is claimed is:

1. A hydraulic valve equipment of a working vehicle, the working vehicle including a vehicle body housing and a forward/rearward travel selector, the hydraulic valve equipment comprising:
   an attachment member formed by one plate-like member, wherein the attachment member has a touching surface and an outwardly facing surface, wherein a plurality of holes are formed inside the attachment member between the touching surface and the outwardly facing surface, wherein the attachment member is exposed and fixed on the vehicle body housing, and wherein the touching surface contacts an outer side surface of the vehicle body housing; and
   a plurality of valves for controlling operation of the forward/backward travel selector, wherein the valves are arranged in the respective holes on substantially the same plane in parallel to the touching surface, and are detachable from the attachment member in respective directions in parallel to the touching surface.

2. The hydraulic valve equipment of the working vehicle as set forth in claim 1, wherein the plurality of valves include at least two valves parallel to each other, or include at least two valve perpendicular to each other.

3. The hydraulic valve equipment of the working vehicle as set forth in claim 1, wherein the plurality of valves include an ON/OFF valve and a proportional valve controlling supply and discharge of pressure oil for the forward/rearward travel selector, and wherein the ON/OFF valve and the proportional valve are arranged in the respective holes so as to be detachable downward from the attachment member.

4. The hydraulic valve equipment of the working vehicle as set forth in claim 1, wherein the plurality of valve include a main relief valve and a regulating valve controlling supply and discharge of lubricating oil for the forward/rearward travel selector, and wherein the main relief valve and the regulating valve are arranged in the respective holes so as to be detachable from the attachment member in the longitudinal direction of the vehicle body housing.

5. The hydraulic valve equipment of the working vehicle as set forth in claim 1, wherein a pressure detection means for detecting pressure of oil supplied to the forward/rearward travel selector is provided inside the attachment member so as to be detachable downward from the attachment member.

6. The hydraulic valve equipment of the working vehicle as set forth in claim 3, wherein the ON/OFF valve and the proportional valve are parallel to each other.

7. The hydraulic valve equipment of the working vehicle as set forth in claim 4, wherein the main relief valve and the regulating valve are parallel to each other.

8. The hydraulic valve equipment of the working vehicle as set forth in claim 2, wherein a pressure detection means for detecting pressure of oil supplied to the forward/rearward travel selector is provided inside the attachment member so as to be detachable downward from the attachment member.

9. The hydraulic valve equipment of the working vehicle as set forth in claim 3, wherein a pressure detection means for detecting pressure of oil supplied to the forward/rearward travel selector is provided inside the attachment member so as to be detachable downward from the attachment member.

10. The hydraulic valve equipment of the working vehicle as set forth in claim 6, wherein a pressure detection means for detecting pressure of oil supplied to the forward/rearward travel selector is provided inside the attachment member so as to be detachable downward from the attachment member.

11. The hydraulic valve equipment of the working vehicle as set forth in claim 4, wherein a pressure detection means for detecting pressure of oil supplied to the forward/rearward travel selector is provided inside the attachment member so as to be detachable downward from the attachment member.

12. The hydraulic valve equipment of the working vehicle as set forth in claim 7, wherein a pressure detection means for detecting pressure of oil supplied to the forward/rearward travel selector is provided inside the attachment member so as to be detachable downward from the attachment member.

13. The hydraulic valve equipment of the working vehicle as set forth in claim 3, wherein the plurality of valves include a main relief valve and a regulating valve controlling supply and discharge of lubricating oil for the forward/rearward travel selector, and wherein the main relief valve and the regulating valve are arranged in the respective holes so as to be detachable from the attachment member in the longitudinal direction of the vehicle body housing.

14. The hydraulic valve equipment of the working vehicle as set forth in claim 13, wherein a pressure detection means for detecting pressure of oil supplied to the forward/rearward travel selector is provided in the respective holes so as to be detachable downward from the attachment member.

15. The hydraulic valve equipment of the working vehicle as set forth in claim 13, wherein the ON/OFF valve and the proportional valve are parallel to each other, wherein the main relief valve and the regulating valve are parallel to each other, and wherein the ON/OFF valve and the proportional valve are perpendicular to the main relief valve and the regulating valve.

* * * * *

UNITED STATES PATENT AND TRADEMARK OFFICE
CERTIFICATE OF CORRECTION

PATENT NO. : 8,033,298 B2
APPLICATION NO. : 11/686282
DATED : October 11, 2011
INVENTOR(S) : Mizuya Matsufuji It is certified that error appears in the above-identified patent and that said Letters Patent is hereby corrected as shown below:

Title Page item 56

In section FOREIGN PATENT DOCUMENTS on page 2, replace "JP 2000-28327" with --JP 2000-283279--.

In section OTHER PUBLICATIONS on page 2, replace "English language Patent Abstracts of Japan for Japanese Patent No. 06-147312 312269" with --English language Patent Abstracts of Japan for Japanese Patent No. 06-147313--.

Signed and Sealed this
Twenty-eighth Day of February, 2012

David J. Kappos
*Director of the United States Patent and Trademark Office*